US009403623B2

(12) United States Patent
Aaland et al.

(10) Patent No.: US 9,403,623 B2
(45) Date of Patent: Aug. 2, 2016

(54) ADJUSTABLE, REUSABLE PACKING CRATE

(71) Applicants: Craig L. Aaland, Eagle, ID (US); Roger B. Nielsen, Meridian, ID (US)

(72) Inventors: Craig L. Aaland, Eagle, ID (US); Roger B. Nielsen, Meridian, ID (US)

(*) Notice: Subject to any disclaimer, the term of this patent is extended or adjusted under 35 U.S.C. 154(b) by 19 days.

(21) Appl. No.: 14/325,364

(22) Filed: Jul. 7, 2014

(65) Prior Publication Data

US 2015/0034636 A1     Feb. 5, 2015

Related U.S. Application Data

(60) Provisional application No. 61/843,277, filed on Jul. 5, 2013.

(51) Int. Cl.
| | |
|---|---|
| *B65D 21/08* | (2006.01) |
| *B65D 88/00* | (2006.01) |
| *B65D 25/10* | (2006.01) |
| *B65D 81/02* | (2006.01) |
| *B65D 81/05* | (2006.01) |

(52) U.S. Cl.
CPC .......... *B65D 21/083* (2013.01); *B65D 21/086* (2013.01); *B65D 25/10* (2013.01); *B65D 81/02* (2013.01); *B65D 81/05* (2013.01); *B65D 88/005* (2013.01); *Y02W 30/807* (2015.05)

(58) Field of Classification Search
CPC ....... A47G 1/08; A47G 1/0644; B65D 21/08; B65D 21/083; B65D 21/086; B65D 2519/00761; B65D 81/02; B65D 81/05; B65D 83/0005; B65D 85/48; B65D 88/005; F16M 2200/061; F16M 2200/063
USPC ........................................................ 40/739
See application file for complete search history.

(56) References Cited

U.S. PATENT DOCUMENTS

| | | | | |
|---|---|---|---|---|
| 723,497 | A | * | 3/1903 | Strauss ..................... A47G 1/08 |
| | | | | 40/741 |
| 1,004,162 | A | | 9/1911 | Le Guisquet |
| 1,633,354 | A | | 6/1927 | Rau |
| 2,078,744 | A | | 4/1937 | Tursky |
| 2,164,299 | A | * | 6/1939 | Mandell ................... A47G 1/08 |
| | | | | 122/1 R |
| 2,739,776 | A | | 3/1956 | Terando |
| 2,895,599 | A | | 7/1959 | Moyer et al. |

(Continued)

FOREIGN PATENT DOCUMENTS

WO    2006/077015 A1    7/2006

*Primary Examiner* — Anthony Stashick
*Assistant Examiner* — Mollie Llewellyn
(74) *Attorney, Agent, or Firm* — Pedersen and Company, PLLC; Ken J. Pedersen; Barbara S. Pedersen

(57) ABSTRACT

An adjustable reusable modular packaging crate and assembly kit is purposed for safe transportation of preferably mostly two-dimensional items. Several latching corner subassemblies each hold two perpendicular frame extensions that may be locked into adjustable lengths to make crate frame sides. Sets of adjustable clamps interact with the item to be shipped and the crate frame, to assist in securing the item to be shipped. Extendable frame components allow for a frame that adjusts precisely to the size of the item to be shipped. Frame locks securely fix the dimensions of the packaging crate. Gusset subassemblies and cross-corner struts add rigidity to the crate. Corner, frame, strut, and gusset components interlock to create a rigid packaging crate. Frame links enable crate frame sides to be connected side-by-side, adding to the depth of the crate frame. The modular crate may be easily disassembled for low-space storage between uses, and easily reassembled for reuse.

16 Claims, 26 Drawing Sheets

(56) References Cited

U.S. PATENT DOCUMENTS

| | | |
|---|---|---|
| 3,451,153 A | 6/1969 | Dohanyos |
| 3,645,389 A | 2/1972 | Castiaux |
| 3,936,968 A | 2/1976 | Gilbert |
| 4,024,659 A | 5/1977 | Ingerdahl |
| 4,373,279 A * | 2/1983 | Abel .................. B44D 3/185 248/488 |
| 4,512,473 A | 4/1985 | Thomaswick et al. |
| 4,664,254 A | 5/1987 | Sitwell et al. |
| 4,890,839 A | 1/1990 | Ayotte |
| 4,892,193 A | 1/1990 | Thomas |
| 5,285,902 A | 2/1994 | Tabuenca Garcia |
| 5,314,159 A | 5/1994 | Szarata |
| 5,518,118 A | 5/1996 | Pütz et al. |
| 5,593,058 A | 1/1997 | Spencer et al. |
| 5,595,301 A | 1/1997 | Pütz et al. |
| 5,655,662 A | 8/1997 | Garcia |
| 5,927,668 A | 7/1999 | Cyrell |
| D449,912 S | 10/2001 | Henriksson et al. |
| 6,318,692 B1 | 11/2001 | Cyrell |
| 6,377,320 B1 | 4/2002 | Ananian et al. |
| 6,808,148 B1 | 10/2004 | Eakle et al. |
| 7,108,141 B2 | 9/2006 | Gonzalez-Rivera |
| 7,204,569 B2 | 4/2007 | Walburn |
| 7,644,820 B2 | 1/2010 | Höhne et al. |
| 8,833,581 B2 * | 9/2014 | Kuo .................. B65D 21/086 220/4.28 |
| 9,139,357 B2 * | 9/2015 | Zhao .................. B65D 85/38 |
| 2002/0057389 A1 | 5/2002 | Ananian et al. |

* cited by examiner

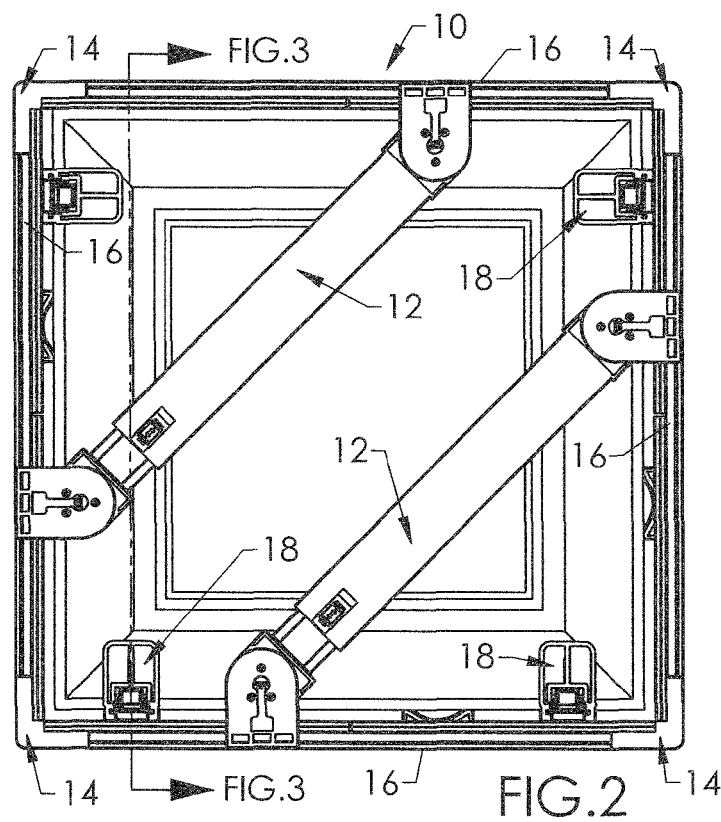
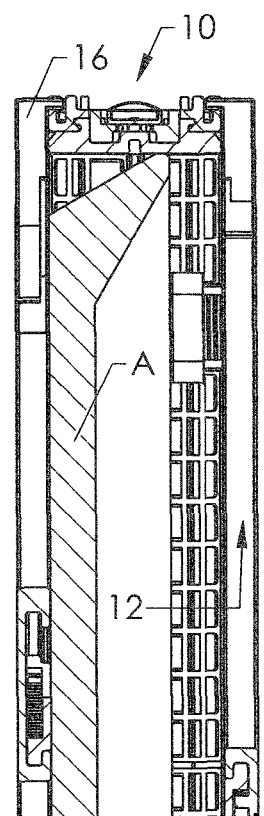
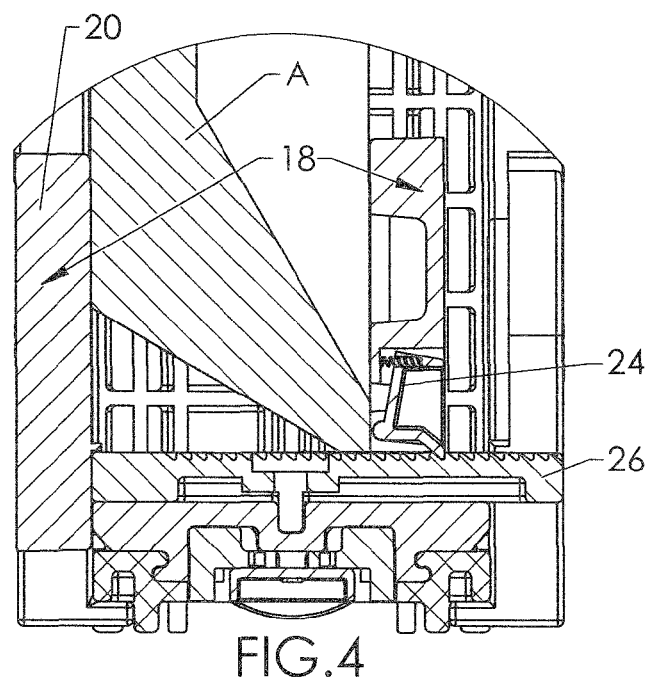
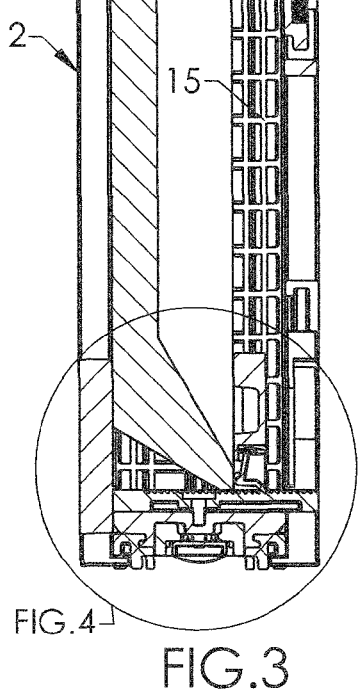
FIG.2
FIG.4
FIG.3

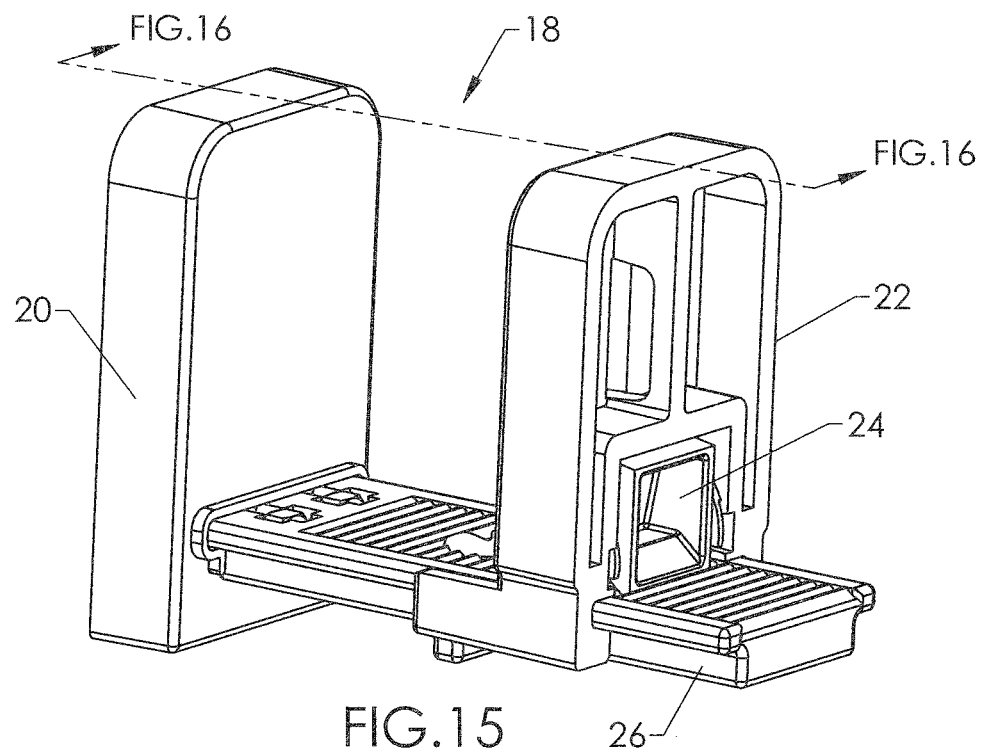
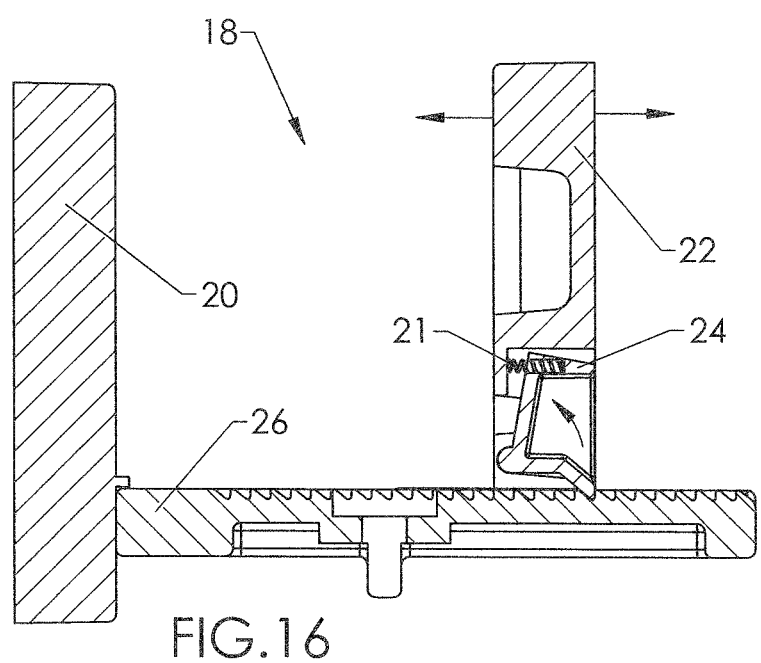

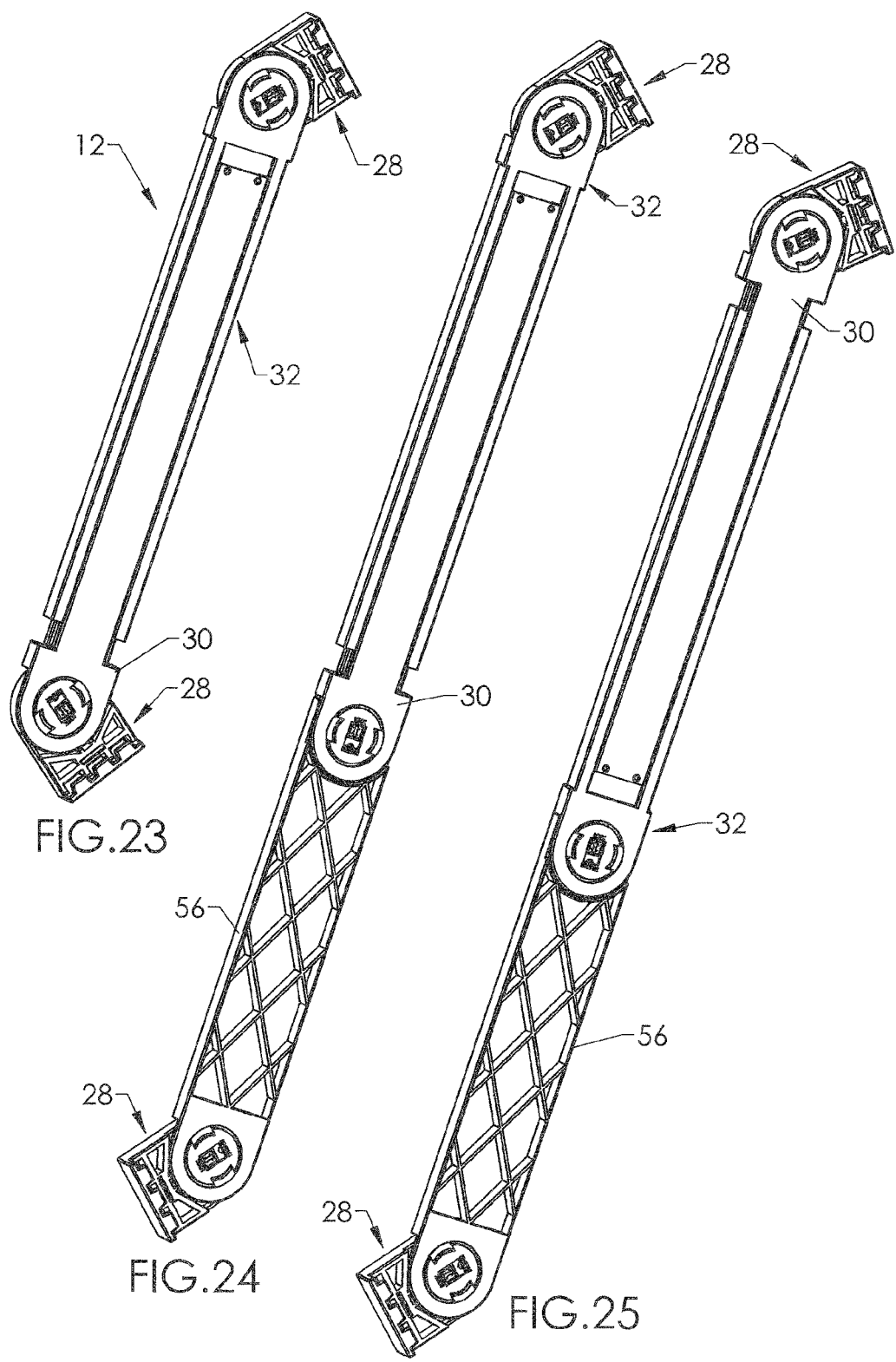

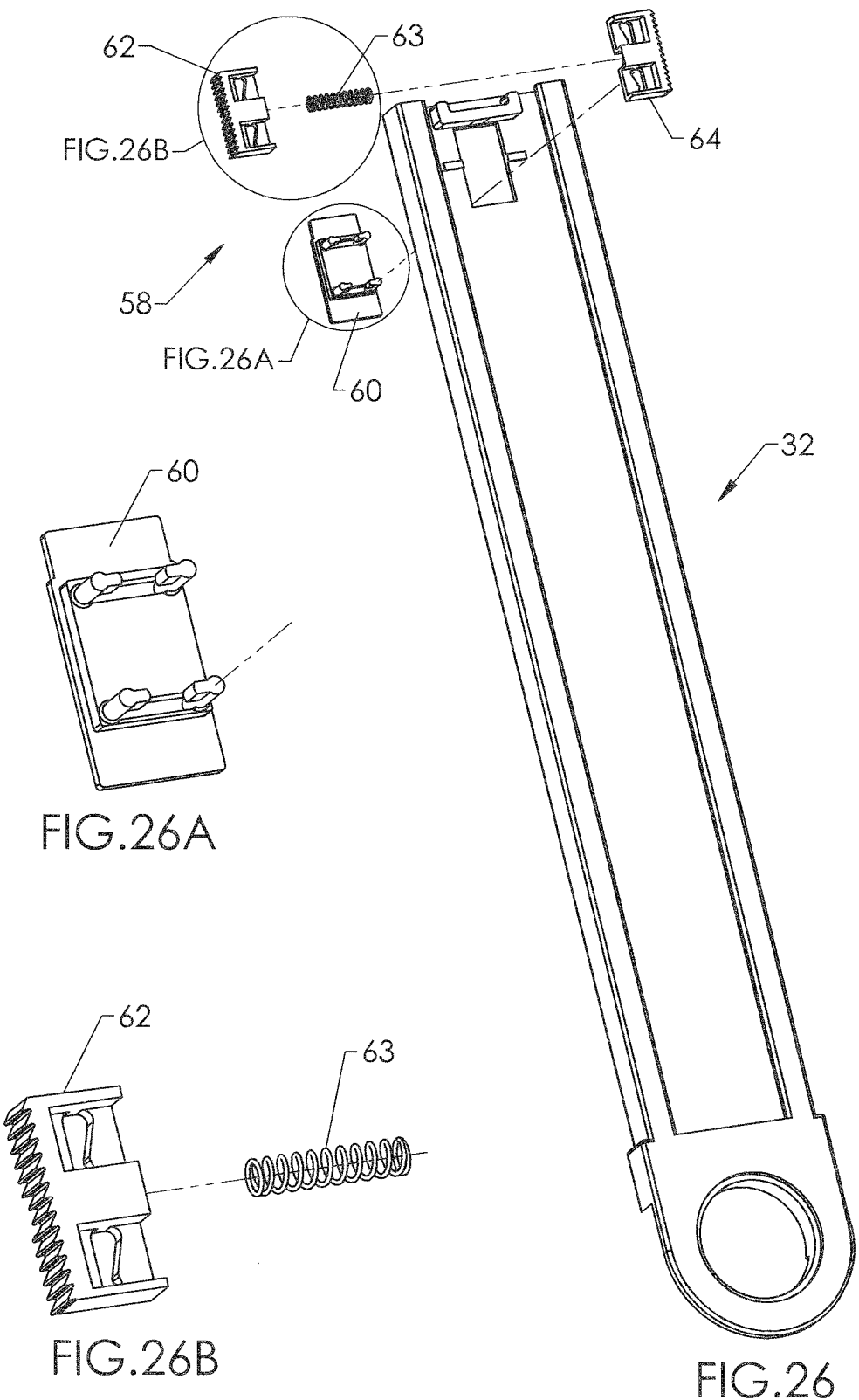

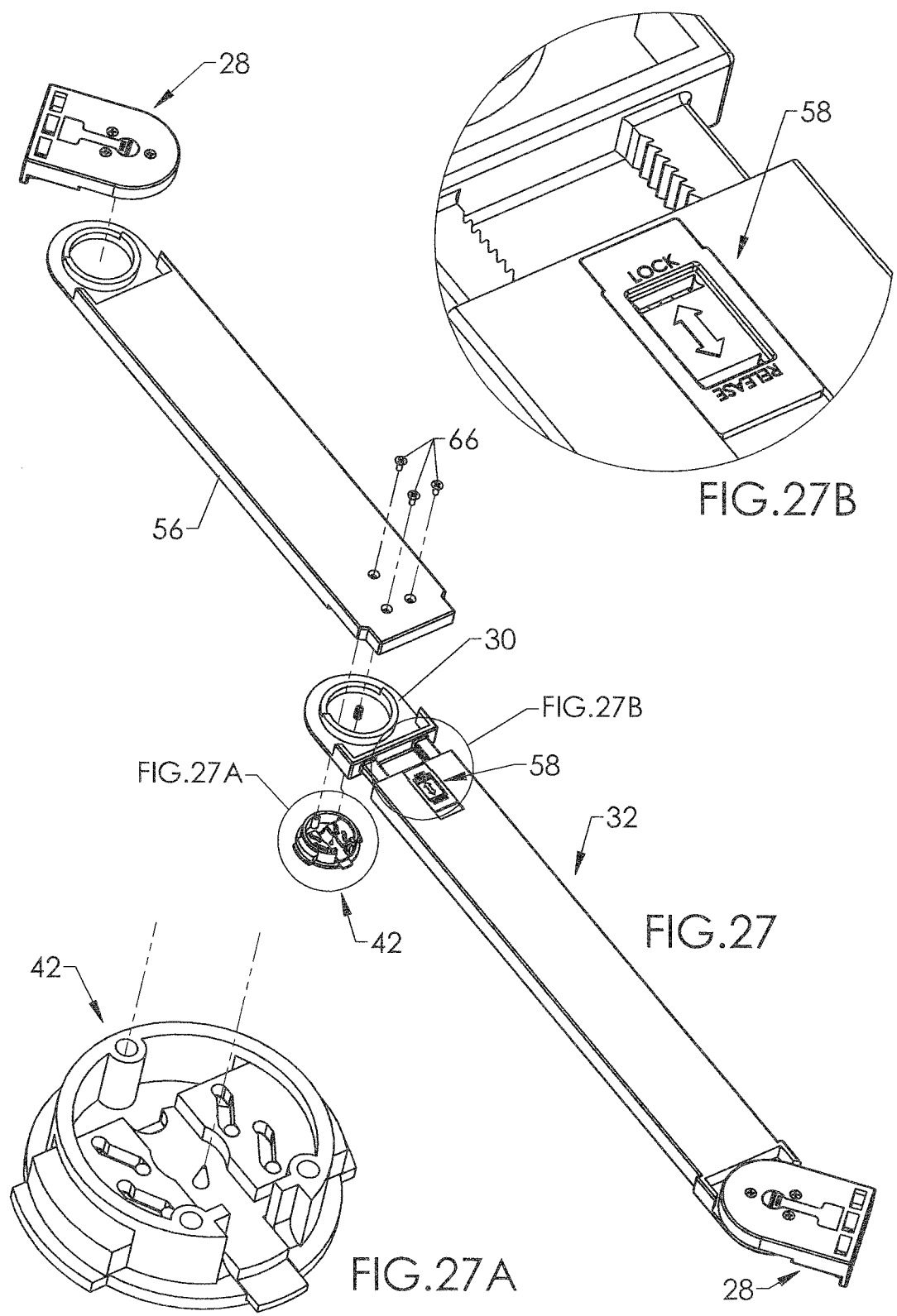

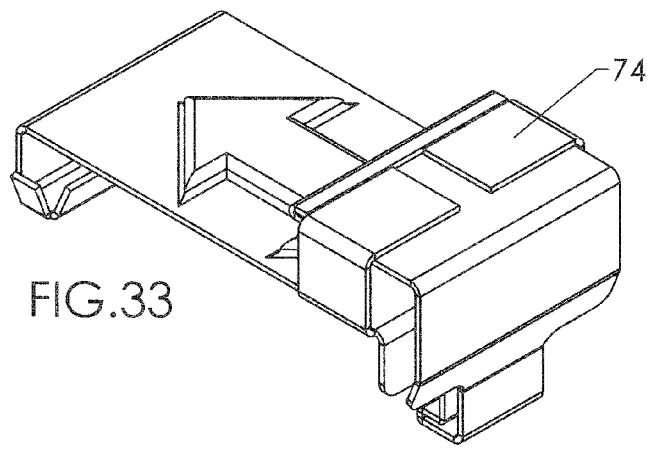
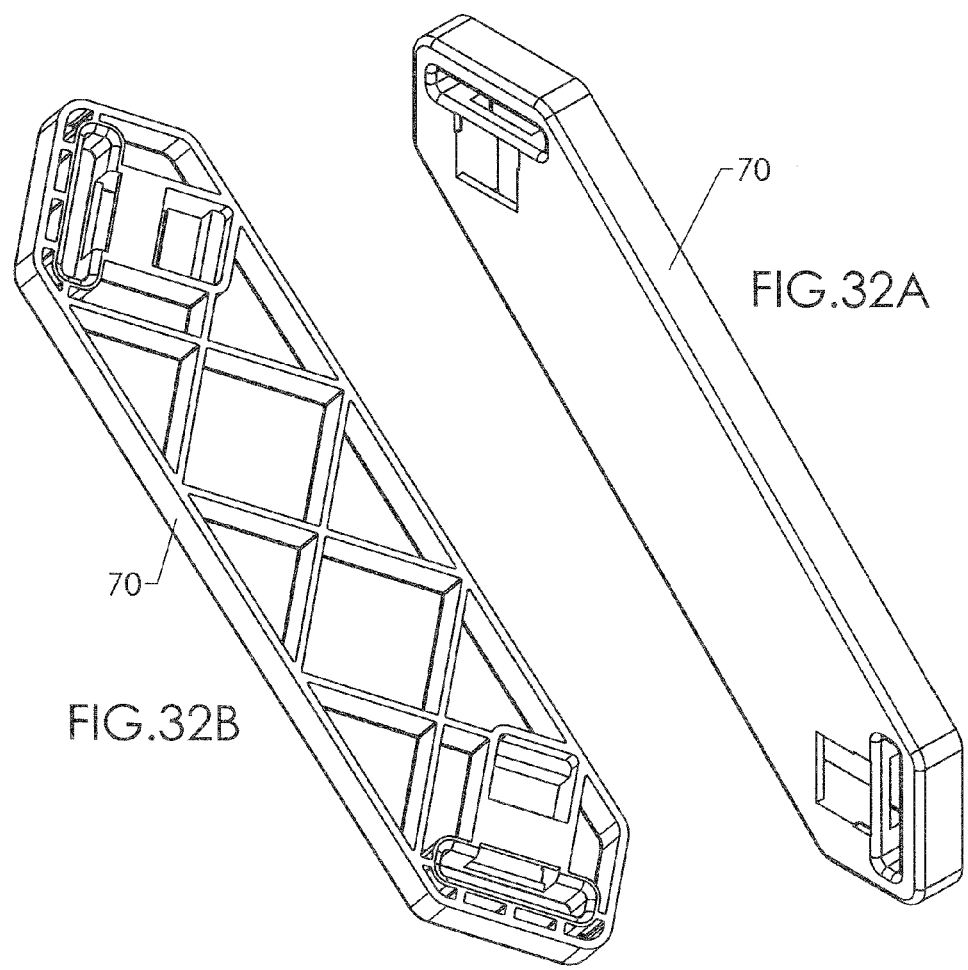

ADJUSTABLE, REUSABLE PACKING CRATE

This application is a Non-Provisional application which claims priority benefit of Provisional Application Ser. No. 61/843,277, filed Jul. 5, 2013, the disclosure of which is hereby incorporated by this reference.

BACKGROUND OF THE DISCLOSED TECHNOLOGY

1. Field of the Invention

The disclosed technology relates to a packaging crate for preferably mostly two-dimensional items, with an adjustable and reusable crate design. The proposed disclosed technology is a modular crating system, made up of interlocking members, that provides a rigid packaging crate that is both adjustable in size, and reusable.

2. Related Art

The safe and secure shipping/transportation of mostly two-dimensional items, like pictures, paintings, and mirrors for example, is frequently accomplished with a packaging crate. Packaging crates prevent damage from storing and moving items during shipping. Packaging crates currently are often customized on-the-spot from lumber by carpenters to contain and constrain the unique shape and size of the item to be shipped. Some pre-fabricated packaging crate frames are adjustable in size or shape.

A common approach for the adjustability of a pre-fabricated packaging crate frame has been to contain an adjustable, inner frame inside of a rigid, nonadjustable outer frame. This "frame-within-a-frame" design often takes up an excessive amount of space due to the need of having an oversized standard, pre-fabricated external frame to contain the smaller customized interior frame. The limitation of this approach is found in the inefficient size of the external frame. Having a larger exterior frame than is necessary, for example, prevents most efficient use of space in the shipping vehicle.

Another approach to an adjustable packaging crate frame is to have sides that adjust in length, sliding past the corners of the frame. When the sides of the frame extend out past the corners, the excess length is cut off to minimize the frame shape which is crucial for efficient packaging. However, once excess length has been cut off a frame perimeter, these "cut-to-fit" crates cannot be reused for the shipping of other items with a larger shape or size. This provides a limitation to the life span and reusability to this style of packaging crate.

To date there has not been an adjustable packaging crate that is both adjustable and reusable for the shipping of preferably mostly two-dimensional items. The proposed disclosed technology addresses this need, providing a packaging crate that can adjust in size, taking up as little space as needed, and also self-contains in incremental adjustments, without needing to trim away any of the then excess frame length, thus preserving the crate's ability to be reused for the shipping of other items with a larger shape or size. The disclosed technology provides a packaging crate that can be adjusted in size and reused without regards to the previous or the next crate configuration. Instead of using an external frame to support an internal adjustable frame, or a frame that is "cut-to-fit", and trimmed away as needed, this disclosed technology uses modular components that interlock, each with adjustability, that allow for multiple configurations to accommodate for numerous different shapes/sizes of the item to be shipped. After use, the instant packaging crate may be conveniently unlocked, disassembled, conveniently stored in small volume, and reused many times.

Thus, the subject packaging crate allows for adjustments in size to fit the item being shipped, and does so without the need for trimming away parts of the packaging crate, thus preserving its ability to be reused and customized for the next item to be shipped. Additionally, the ability of the subject packaging crate to be disassembled allows it to be shipped and/or stored in a low-volume space. This is a great advantage in the shipping and transportation business where space is highly-valued. This disassembly also allows for convenient reuse and recustomization, ease of transportation, and lowered delivery costs for the consumer.

SUMMARY OF THE DISCLOSED TECHNOLOGY

An adjustable, reusable packaging crate made up of modular components is proposed to enable the safe and secure transportation of preferably mostly two-dimensional items, and to be reusable with capability for multiple, different configurations of shape and size. This packaging crate is comprised of corner subassemblies, adjustable frame subassemblies, and cross-frame gusset subassemblies that interlock to allow for rigidity when assembled in multiple convenient configurations. After use, the subject packaging crate may be conveniently unlocked, disassembled, and reused many times. The ability to be disassembled allows the packaging crate to be broken down into a low-volume space, therefore allowing it to be conveniently and economically stored in moving trucks and warehouses, and easily and economically shipped by a common carrier.

In one preferred embodiment, the corners of the crate contain frame latch subassemblies, each of which lock in one end of one adjacent adjustable frame subassembly, known as an extension frame side. The other end of the extension frame side is locked into another frame subassembly known as a locking frame member. The locking frame members and corner subassemblies with their interlocked extension frame members create the outer frame perimeter of the packaging crate. This outer frame perimeter, which may be two-, three- or four-sided, is adjustable in size, using varying extension frame sizes and varying adjustable lock locations along the extension frames.

Also, clamp subassemblies contained within the frame perimeter securely hold the item being shipped. A jaw of the clamp fixes to the bottom edge of a clamp body connected to the crate frame, to create a clamp base for the item to be shipped to rest against, and be secured to. For example, in one embodiment, the middle of the clamp body contains a countersunk bolthole which is used to bolt the clamp body to an extension frame in a location that is adjustable and depends upon the size and shape of the item being shipped. To secure the item into place, an adjustable jaw is used. Preferably, the adjustable jaw slides along the side edges of the clamp body, and runs aside a tooth pattern on the face of the clamp body. The tooth pattern of the preferred clamp body and an interior wedged surface of the preferred adjustable jaw interlock, creating a locking mechanism that will not likely loosen during shipping.

Also, gusset subassemblies add cross-frame member support and rigidity for either perpendicular or parallel locking frame sides. In various embodiments, the gusset subassemblies are comprised of a gusset latchhalf, gusset toothhalf, gusset locks, rotatable gusset head, rotatable axle plate, and optional gusset extension subassemblies. The main body of the gusset contains the gusset latchhalf, gusset toothhalf and the gusset lock. The gusset toothhalf slides within the gusset latchhalf and is locked into place with the gusset lock. The gusset lock, when engaged, interlocks with the tooth pattern along an edge of the gusset toothhalf. The gusset lock therefore prevents the gusset body from elongation while allowing convenient shortening for adjustment purposes once it is engaged.

In a preferred embodiment, on either end of the main gusset body are pivoting mounting points for attaching the gussets to either the locking or extension frame members. The pivoting mounting points are comprised of either the end of a gusset toothhalf or the end of the gusset latchhalf, a rotatable gusset head and a rotatable axle plate. The components of the pivoting mounting points create a mounting joint that compensates for an adjustable frame perimeter, allowing for mounting at varying cross-frame angles. An option available for the shipping of larger items is gusset extensions. Gusset extensions replace a rotatable gusset head on one end of the gusset subassemblies allowing a larger frame perimeter to be reinforced.

Another option for additional rigidity of the crate frame is to use circumferential straps. These straps wrap around the fully assembled packaging crate reinforcing the overall frame. The straps may be composed of a buckle tie-down, and a cinch strap. Another option for additional rigidity of the crate frame is to use cross-corner struts known as bolsters firmly connected to the lateral sides of adjacent extension frames.

BRIEF DESCRIPTION OF THE DRAWINGS

FIG. 2 is a front view of FIG. 1. The line labeled FIG. 3-FIG. 3 is for the cross sectional view FIG. 3.

FIG. 3 is a cross sectional view along line FIG. 3-FIG. 3 of FIG. 2.

FIG. 4 is an expanded detail view from the circled area of FIG. 3.

FIG. 15 is an isometric view of an adjustable clamp subassembly of the subject packaging crate system.

FIG. 16 is a cross sectional view along line FIG. 16-FIG. 16 of FIG. 15. The movement arrows show adjustment directions of the adjustable jaw and rotation of the clamp trigger.

FIG. 23 is an isometric view of a gusset subassembly in a shortened state.

FIG. 24 is an isometric view of the gusset subassembly of FIG. 23, with a gusset extension attached to the gusset toothhalf end of the gusset subassembly.

FIG. 25 is an isometric view of a gusset subassembly with a gusset extension attached to the gusset latchhalf end of the gusset subassembly.

FIG. 26 is an exploded isometric view of the gusset latchhalf.

FIG. 26A is a detail view of the gusset lock slide shown in the circled region 26A of FIG. 26.

FIG. 26B is a detail view of half a gusset lock and a spring that is located between the two halves of the gusset lock shown in the circled region 26B of FIG. 26.

FIG. 27 is a partially exploded isometric view of a gusset subassembly and gusset extension.

FIG. 27A is a detail view of the lock release mechanism shown in the circled region 27A of FIG. 27. This is the lock for preventing additional rotation.

FIG. 27B is a detail view of the lock release mechanism as well as the locking teeth of the gusset toothhalf shown in the circled region 27B of FIG. 27. This is the lock for preventing additional lateral movement.

FIG. 32A is a top, perspective view of the outside of a cross-corner strut 70.

FIG. 32B is a top, perspective view of the inside of a cross-corner strut 70.

FIG. 33 is a top, perspective view of an active, second lock 74 for gusset lock 58.

DETAILED DESCRIPTION OF EMBODIMENTS OF THE DISCLOSED TECHNOLOGY

An adjustable, reusable packaging crate constructed from modular components, purposed for safe transportation of preferably mostly two-dimensional items is disclosed. Shown in the Figures are several, but not the only, embodiments of an adjustable, reusable modular packaging crate. Adjustable and substitutable modular components allow for multiple different embodiments of this adjustable, reusable modular packaging crate.

Figure 1:
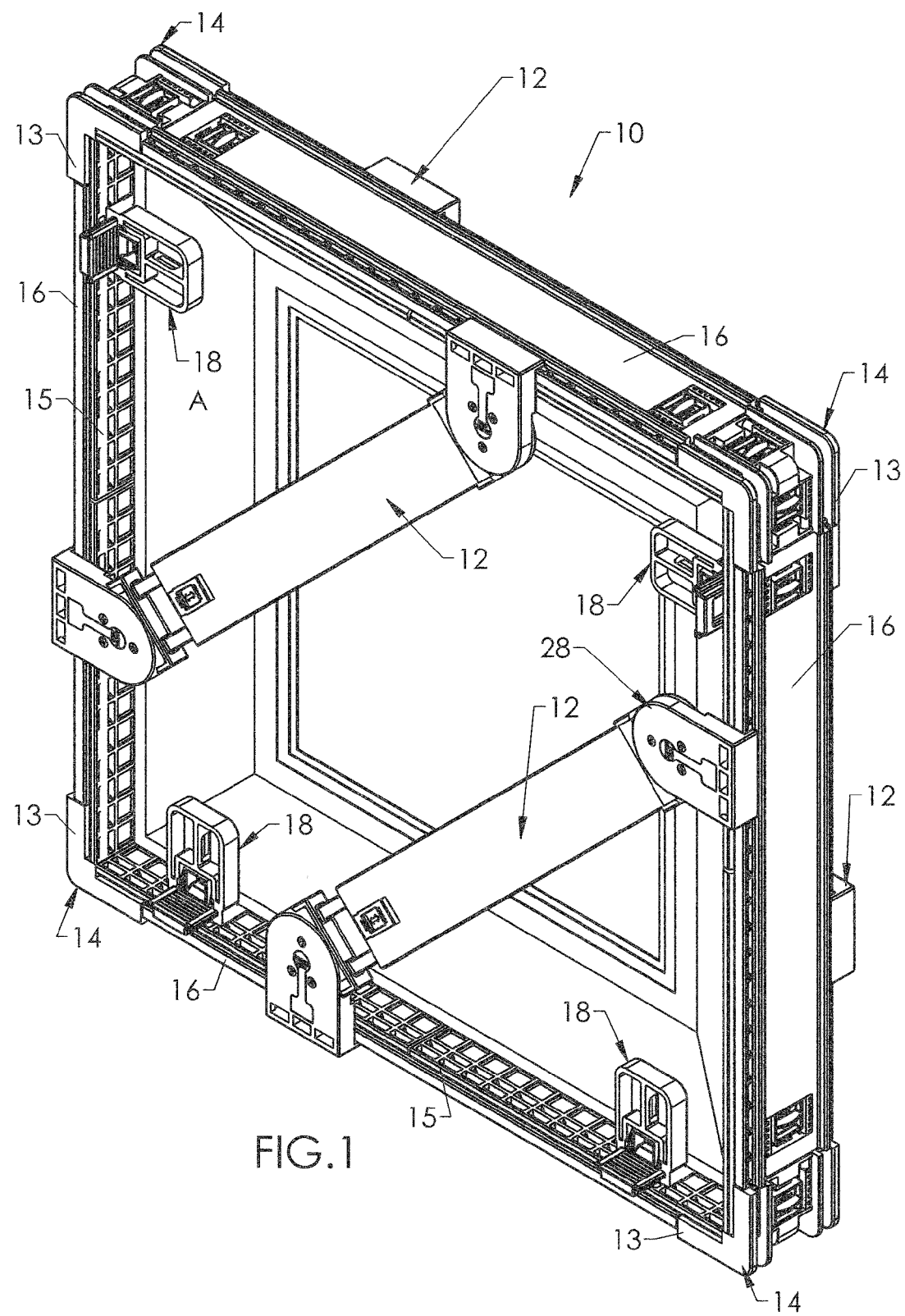
FIG. 1 is an isometric view of an example embodiment of the subject packaging crate system. This view shows the packaging crate adjusted to a small size with a picture frame secured within it as the item to be shipped.

FIGS. 1-2 show an isometric and front view of a subject packaging crate system 10. The packaging crate 10 shown is comprised of several subassemblies, which are shown assembled together into a compact non-extended version of the packaging crate 10. The embodiment illustrated by FIGS. 1-2 shows two cross-frame gusset subassemblies 12 attached to the front and two attached to the back of the packaging crate frame. The illustrated embodiment of the packaging crate frame is made up of four corner subassemblies 14, and four respective locking frame members 16 mated together. Each corner subassembly 14 is comprised of two short frame extension members 15, which latch into a corner 13. The short frame extension members 15, which act as the connecting members between corners 13 and locking frame members 16, can be more clearly seen in the partially expanded frame embodiment of FIG. 5. Locking frame members 16 slide relative to the short frame extension members 15, and lock into place at a selected, desired length. Inside of this shown packaging crate is an example item to be shipped, for this example a picture frame A, shown to illustrate its containment within the packaging crate frame. The picture frame A is locked into place by four adjustable clamp subassemblies 18 that are adjustably mated to the inside of the short frame extension members 15. Seen in FIG. 2 is the cross sectional line FIG. 3-FIG. 3, to show the cross sectional view FIG. 3.

FIGS. 3-4 are cross sectional views of the packaging crate 10 embodiment illustrated in FIGS. 1-2. FIG. 3 shows how the example picture frame A is secured in place when the packaging crate 10 encompasses it snugly and securely. The example picture frame A can be seen resting against the solid jaw 20, and adjustable jaw 22 of the adjustable clamp subassembly 18, and resting against the gusset subassembly 12. Circled in FIG. 3 is a region labeled FIG. 4, which when enlarged shows details of the adjustable clamp subassembly 18 in cross section. Inside of FIG. 4, the teeth along the clamp body can be seen allowing the adjustable jaw 22 of the adjustable clamp subassembly 18 to be pushed into place. A spring loaded clamp trigger 24 interlocks with the teeth along the clamp body 26, working to provide a firm, adjustable clamping function. To release the adjustable clamp subassembly's grasp, the spring loaded clamp trigger 24 must be rotated up and away from the clamp body's teeth, around an integral axis.

Figure 5:
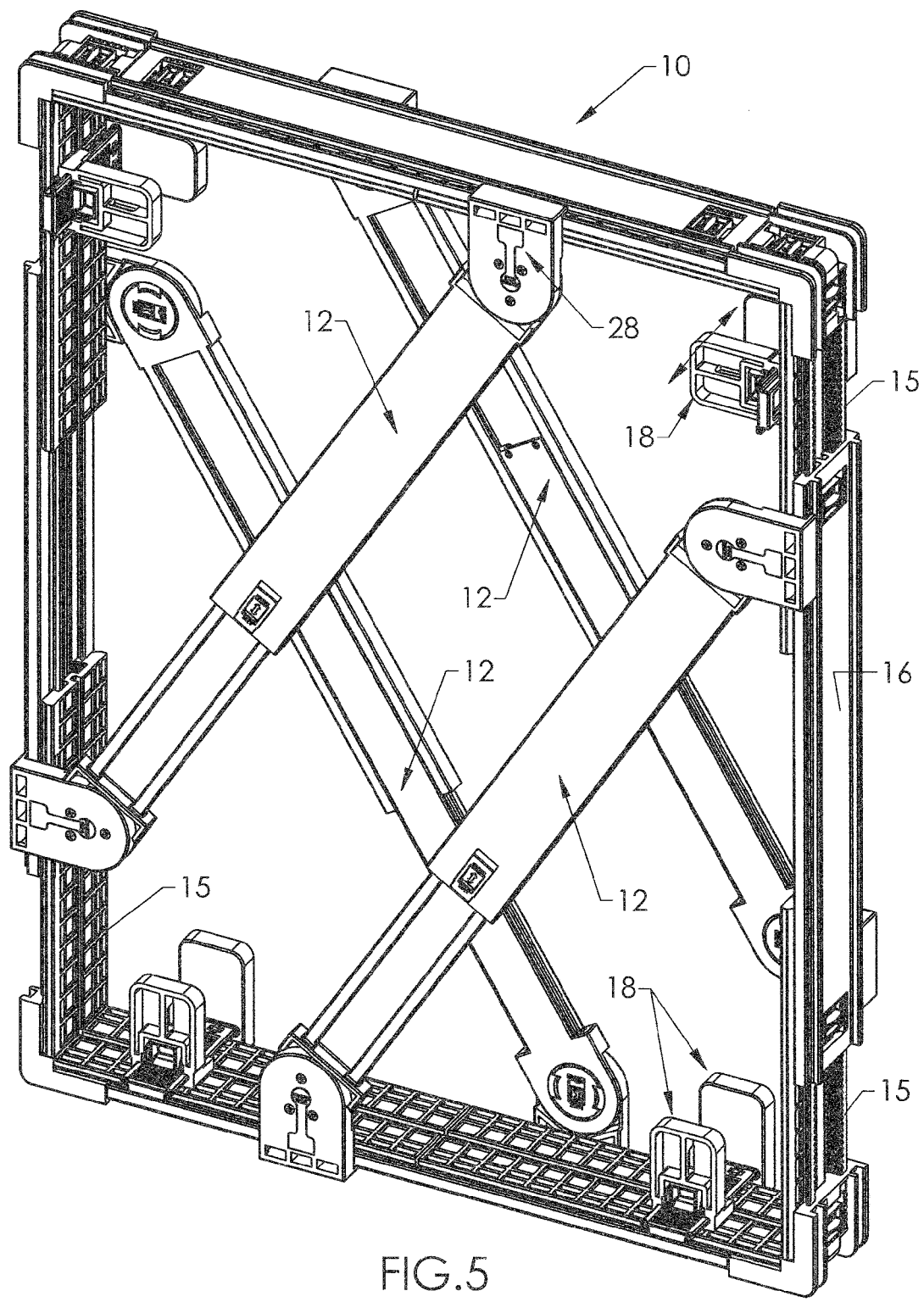
FIG. 5 is an isometric view of an example embodiment of the subject packaging crate, but without a picture frame being secured within it. A movement arrow is located near the upper right corner of this image, showing an example direction that a clamp of the packaging crate may adjust.

FIG. 5 shows the packaging crate 10 in an extended, expanded version, and with the picture frame A from FIGS. 1-4 removed. This extended packaging crate 10 embodiment shows the gusset subassemblies 12, partially extended, attached to the front and back of the packaging crate frame providing additional structural support. A movement arrow in the upper right corner of this frame shows the movement of the adjustable clamp subassembly 18. As seen in this version of the packaging crate 10, the sides of the packaging crate frame can be different in length.

Figure 6:
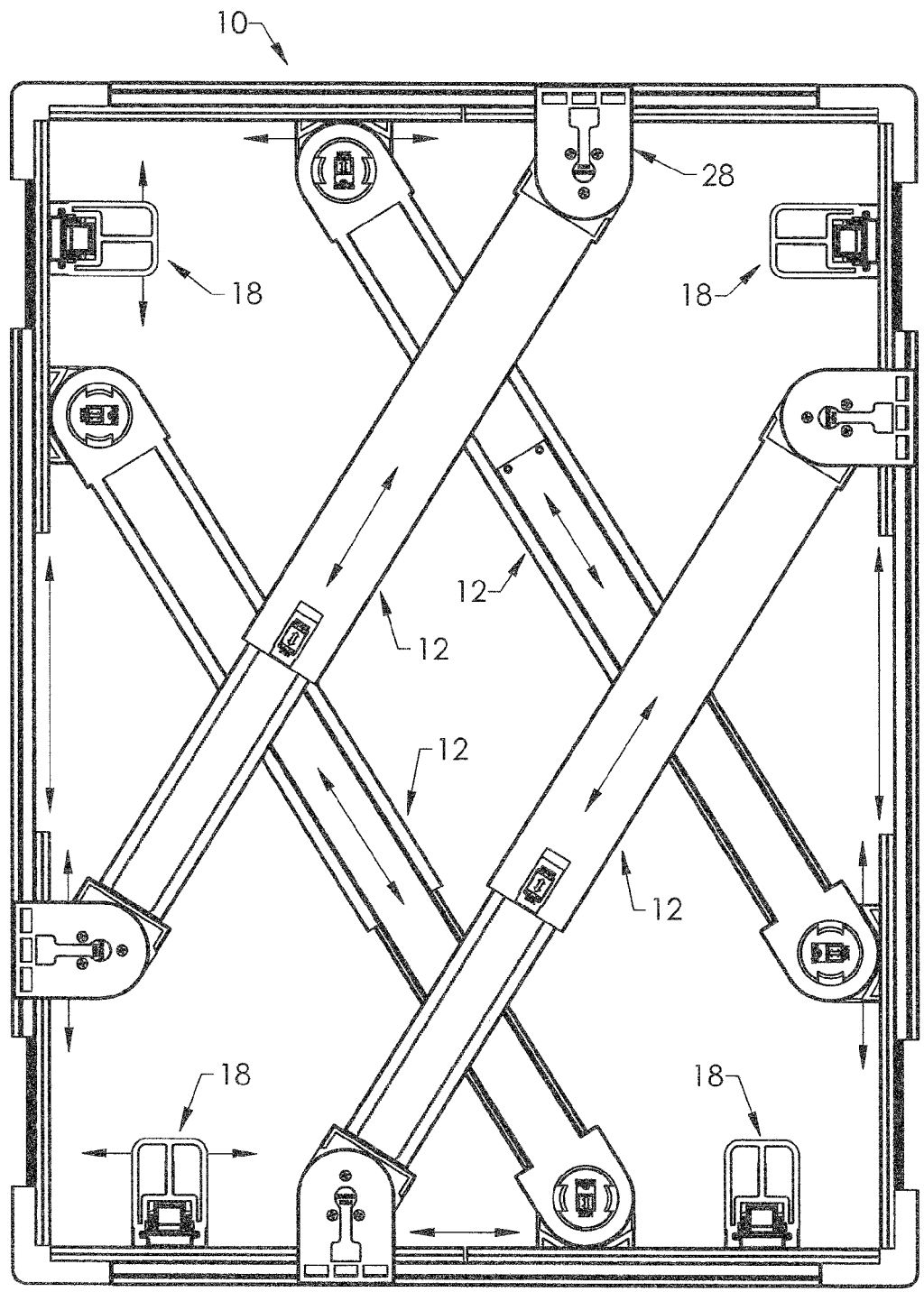
FIG. 6 is a front view of the packaging crate of FIG. 5. Numerous movement arrows show the different directions in which the parts of the packaging crate may adjust.

FIG. 6 is a front view of the packaging crate version of FIG. 5. This front view illustrates with movement arrows the capability of the subassemblies of the packaging crate 10 to provide numerous different options for multiple different adjustments and orientations. These differing adjustments make it possible for the packaging crate 10 to accommodate items to be shipped of varying sizes time and time again.

Figure 7:
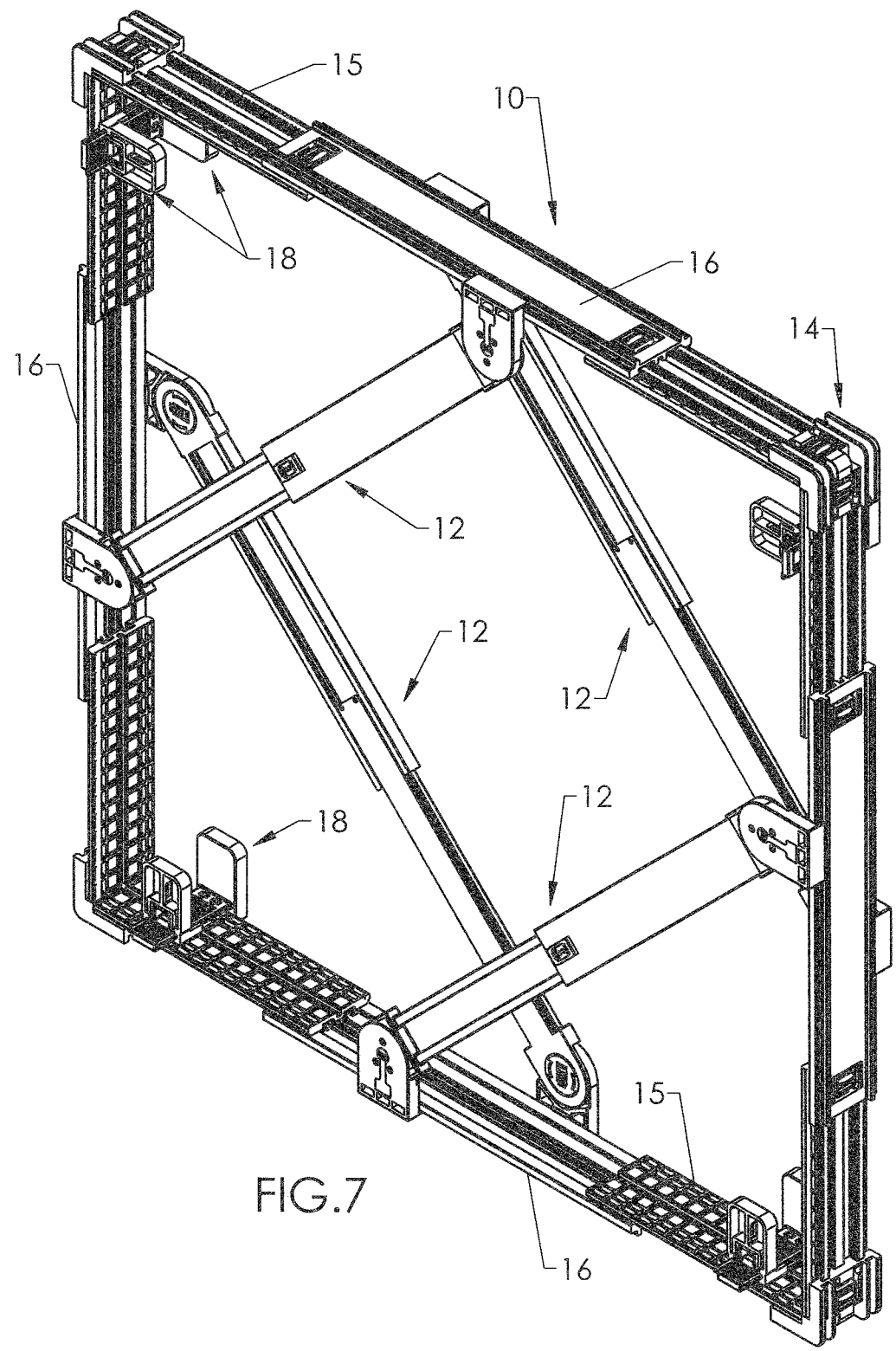
FIG. 7 is an isometric view of an example embodiment of the packaging crate. This packaging crate embodiment shows the embodiment of the packaging crate depicted in FIG. 5, but extended to nearly its full extent.

As the adjustments of the packaging crate 10 expand further, and make a larger frame perimeter, the packaging crate 10 will reach a near-full extent length. A view of a packaging crate embodiment at near-full extent using the short frame extension members 15 is shown in FIG. 7. When the packaging crate frame reaches a near full extent with the short frame extension members 15, alternate long frame extension members 17, seen in FIG. 12, may be swapped out in place of the short frame extension members 15 for a larger frame perimeter.

Figure 8:
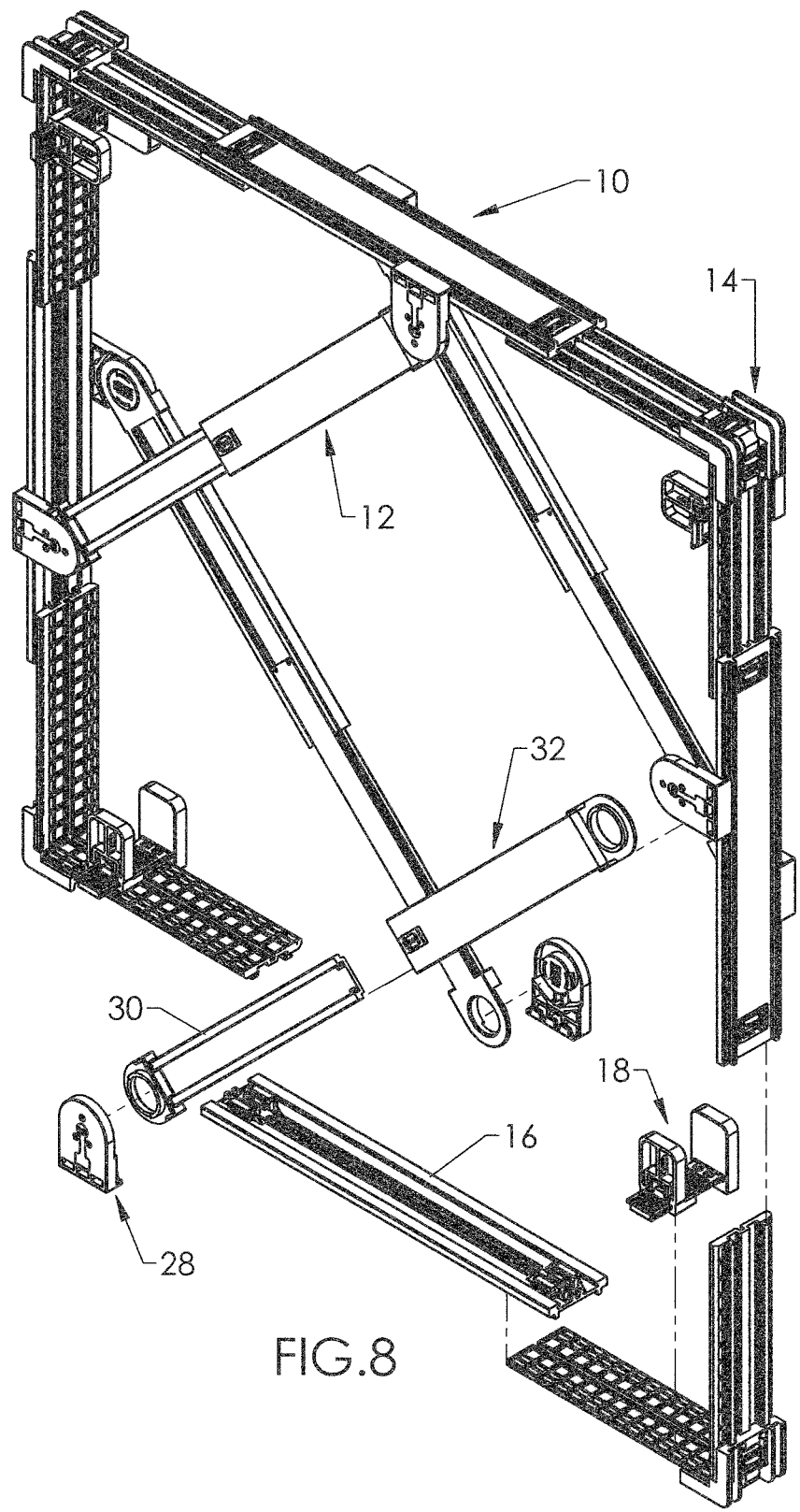
FIG. 8 is a partially exploded isometric view of the packaging crate of FIG. 7.

FIG. 8 shows a partially exploded view of the packaging crate version of FIG. 7. The view shown in FIG. 8 has subassemblies of packaging crate 10 separated to help better illustrate the parts being assembled and their location within the assembly. Subassemblies shown in FIG. 8 are the corner subassembly 14, locking frame member 16, gusset swivel 28, gusset toothhalf 30, gusset latchhalf 32, and the adjustable clamp subassembly 18.

Figure 9:
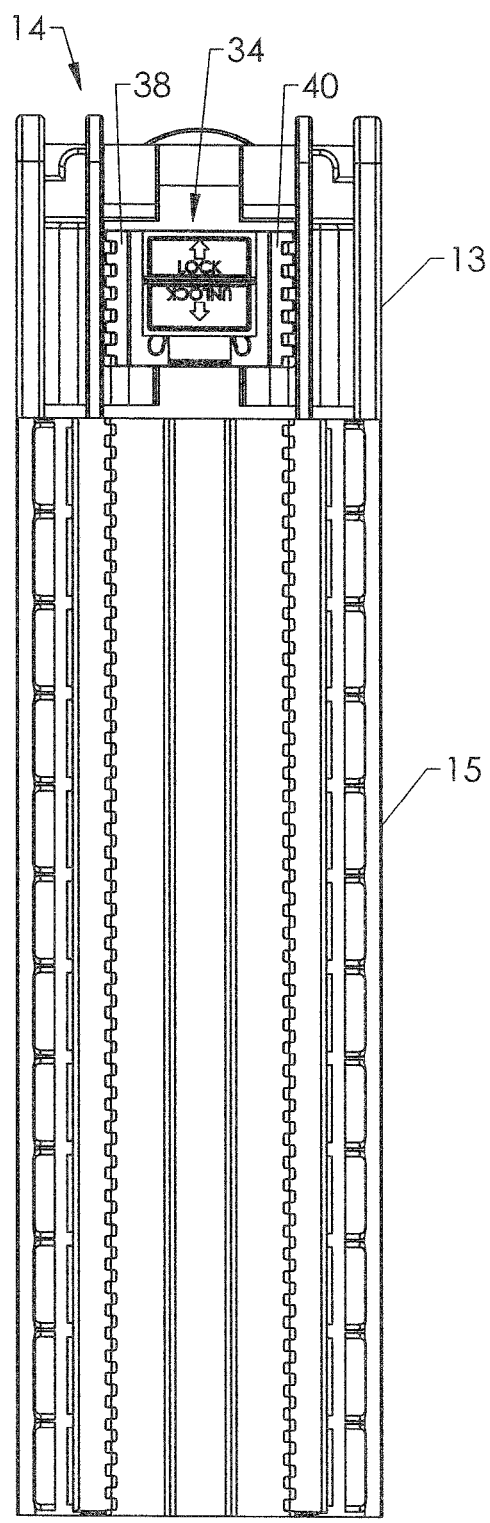
FIG. 9 is a side view of a corner and short frame extension subassembly of the subject packaging crate system. In this view, the corner lock can be seen to be engaged.
Figure 10:
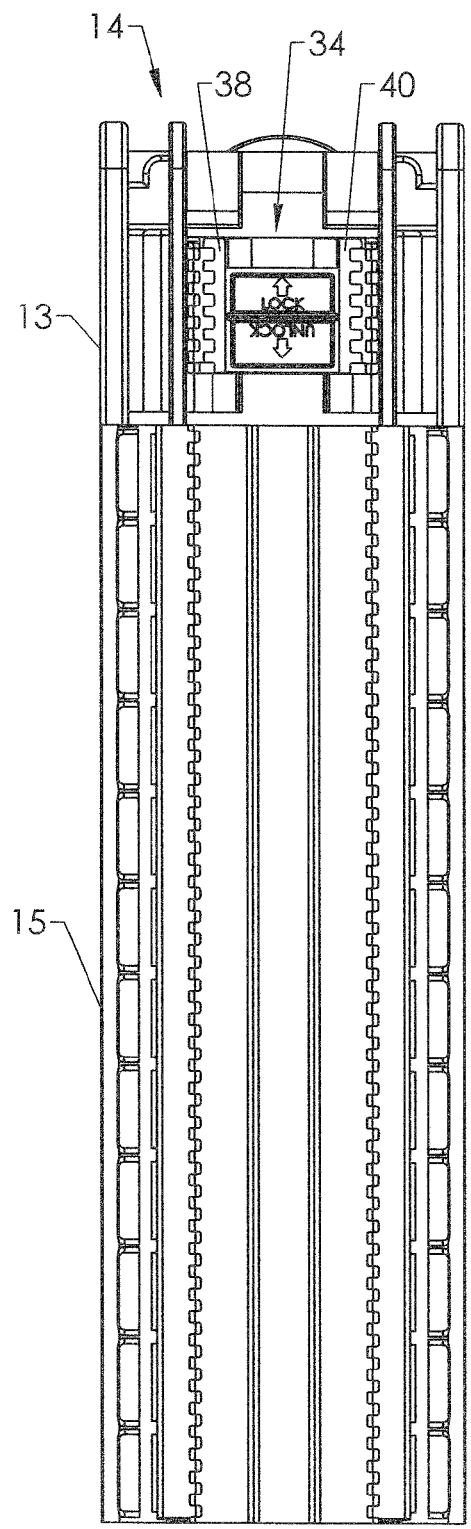
FIG. 10 is another side view of the view of FIG. 9. In this FIG. 10 view, the corner lock can be seen to be disengaged.
Figure 11:
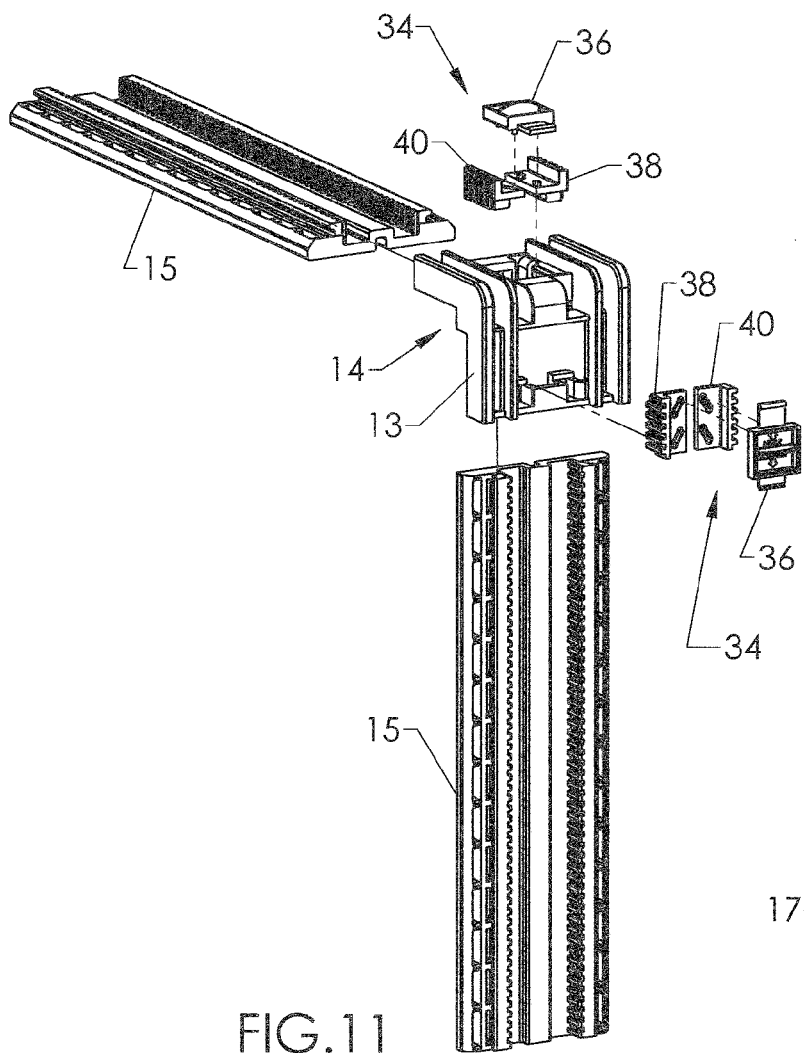
FIG. 11 is an exploded isometric view of an embodiment of a corner and short frame extension subassembly of the subject packaging crate system. This subassembly is shown with two short frame extensions.

The corner subassemblies illustrated in FIGS. 9-10, demonstrate the difference between a corner subassembly with a locked and unlocked frame member, respectively. The corner subassembly 14 shown in FIG. 9 has interlocking tooth patterns that are engaged with a frame lock 34. The interlocking tooth patterns of the corner subassembly 14 shown in FIG. 10 are not engaged, as the frame lock 34 is in the "unlock" position. An exploded view of the corner subassembly 14 is shown in FIG. 11. In the exploded view of the corner subassembly 14, the frame lock 34 can be seen broken down into its three components. The components of frame lock 34 are the sliding thumb lock 36, which the consumer pushes up in this case with a single finger or thumb to engage the frame lock 34, and the frame lock's toothed left 38 and right 40 sides which interlock with the tooth patterned along the inside of the channel in the frame extension member.

Figure 12:
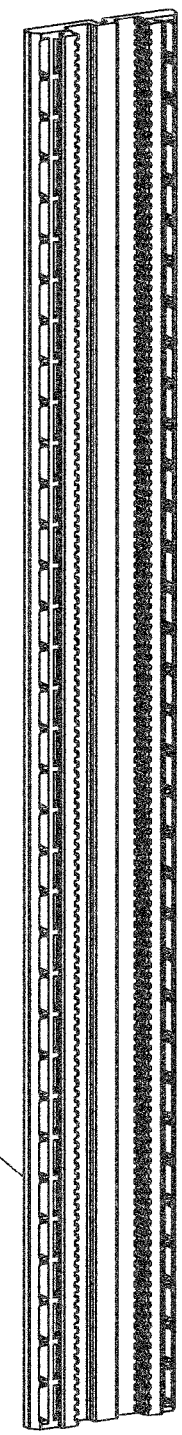
FIG. 12 is an isometric view of a long frame extension member of the subject packaging crate system.

As disclosed earlier, to make a packaging crate frame with a larger perimeter, a long frame extension member 17, as shown in FIG. 12, can be used. The long frame extension member 17 interlocks into the corner subassemblies 14 in the same way as the short frame extension members 15 as shown in FIGS. 9-11.

Figure 13:
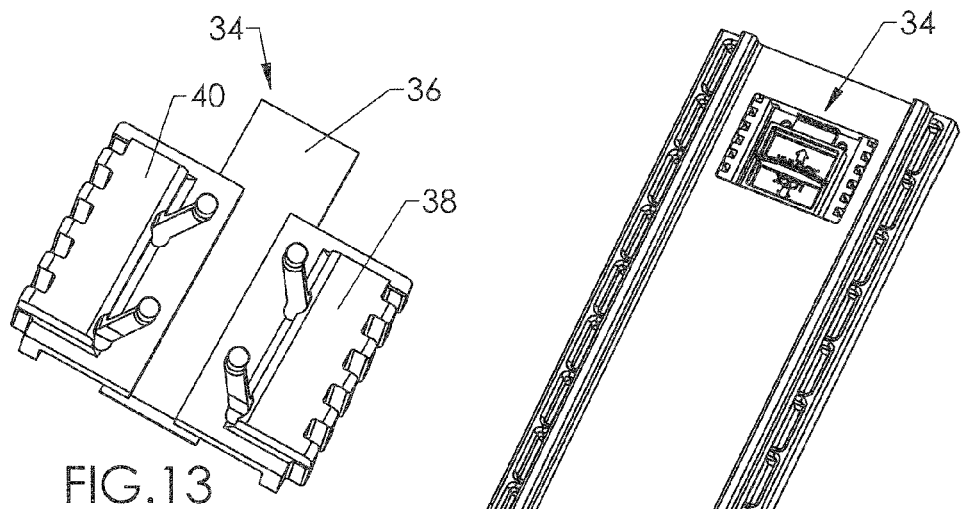
FIG. 13 is a detailed isometric view of the frame lock mechanism of FIG. 11.
Figure 14:
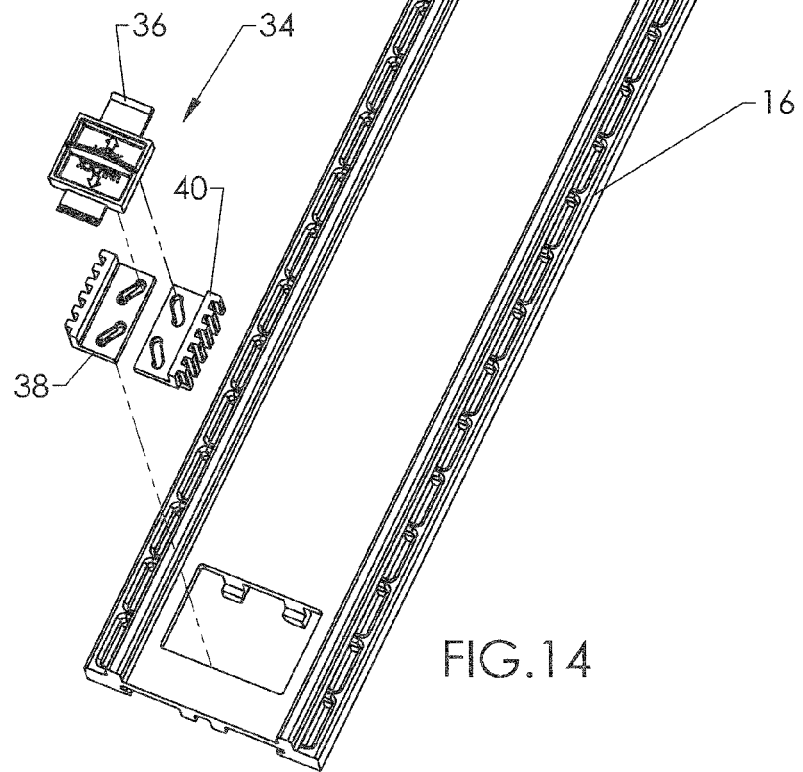
FIG. 14 is a partially exploded isometric view of a locking frame member.

FIG. 13 shows a frame lock 34 with the frame lock left side 38 and frame lock right side 40 components shown on top of the sliding thumb lock 36 component. Channels cut into the frame lock left side 38 and frame lock right side 40, slide along pegs of the sliding thumb lock 36 to engage or disengage the frame lock 34. The locking frame member 16 shown in FIG. 14 uses the frame lock 34 to attach to short frame extension member 15 or long frame extension members 17, similar in fashion to the corner subassemblies 14 in FIGS. 9-11. Each locking frame member 16 contains two frame locks 34, one for each end, to lock-in two adjacent frame extension members.

The adjustable clamp subassembly 18 is shown isolated in FIG. 15. With the isolated view of FIG. 15, the adjustable clamp subassembly 18 can be seen to be composed of a clamp body 26, a fixed jaw 20, an adjustable jaw 22, and a clamp trigger 24. The clamp trigger 24 shown is engaged into the clamp body 26 and therefore acts to prevent the adjustable jaw 22 from sliding away from the fixed jaw 20. Seen in FIG. 15 is the cross section line 16-16 for the cross sectional view FIG. 16.

The cross section of the adjustable clamp subassembly 18, seen as FIG. 16, shows the inner workings of the adjustable jaw 22 and clamp trigger 24. A spring 21 located within the adjustable jaw 22 and clamp trigger 24 acts to keep pressure on the clamp trigger 24, forcing it to be interlocked with the clamp body 26 unless the consumer compresses the spring 21 by lifting up the clamp trigger 24 with a finger or thumb. Movement arrows in FIG. 16 show the available motion of parts in the adjustable clamp subassembly 18. The clamp trigger 24 has a motion arrow showing the motion that the clamp trigger 24 would take to disengage from the clamp body 26. The adjustable jaw 22 has motion arrows that show the sliding motion that the adjustable jaw 22 can take if the clamp trigger 24 is disengaged from the clamp body 26. The adjustable jaw 22 can either slide closer to the fixed jaw 20 until it contacts the item being shipped, or the adjustable jaw 22 can slide away from the fixed jaw 20 as long as the clamp trigger 24 is disengaged.

Figure 17:
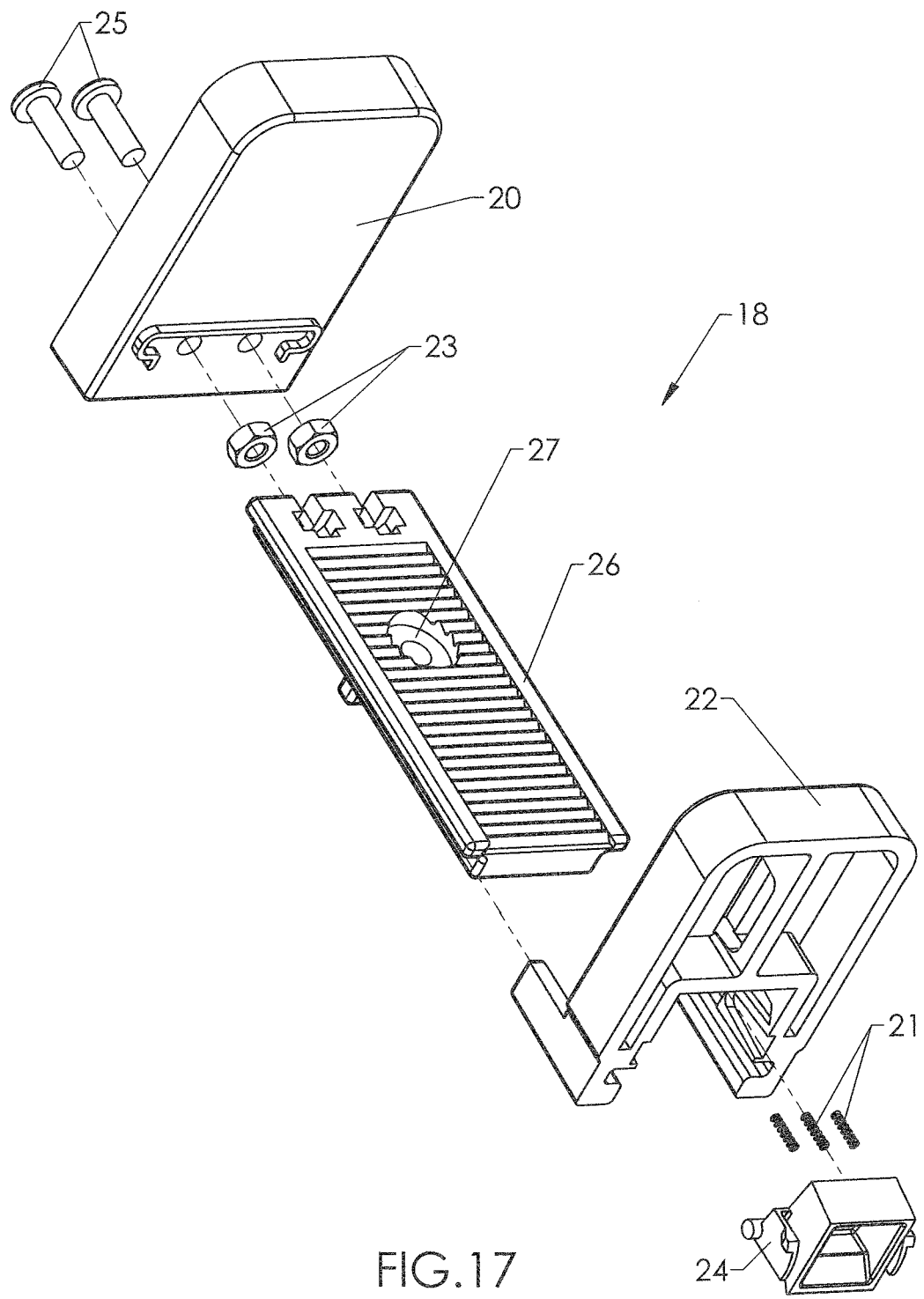
FIG. 17 is an exploded isometric view of the adjustable clamp subassembly of FIGS. 15 and 16.

An exploded view of the entire adjustable clamp subassembly 18 in FIG. 17 shows the components that make up the adjustable clamp subassembly 18. Unique to this view, now shown are the fasteners, two nuts 23 and two bolts 25, which hold the fixed jaw 20 to the clamp body 26. Also newly shown in this view are multiple springs 21 for operating the clamp trigger 24. In this embodiment, the adjustable clamp subassembly 18 is shown using three springs 21 to operate its clamp trigger 24, however it can use up to five springs 21 if desired. Better illustrated in this view, seen in the middle of the clamp body 26, is a counter sunk hole 27 that is used to contain the head of the fastening bolt used to connect the adjustable clamp subassembly 18 to the packaging crate frame.

Figure 18:
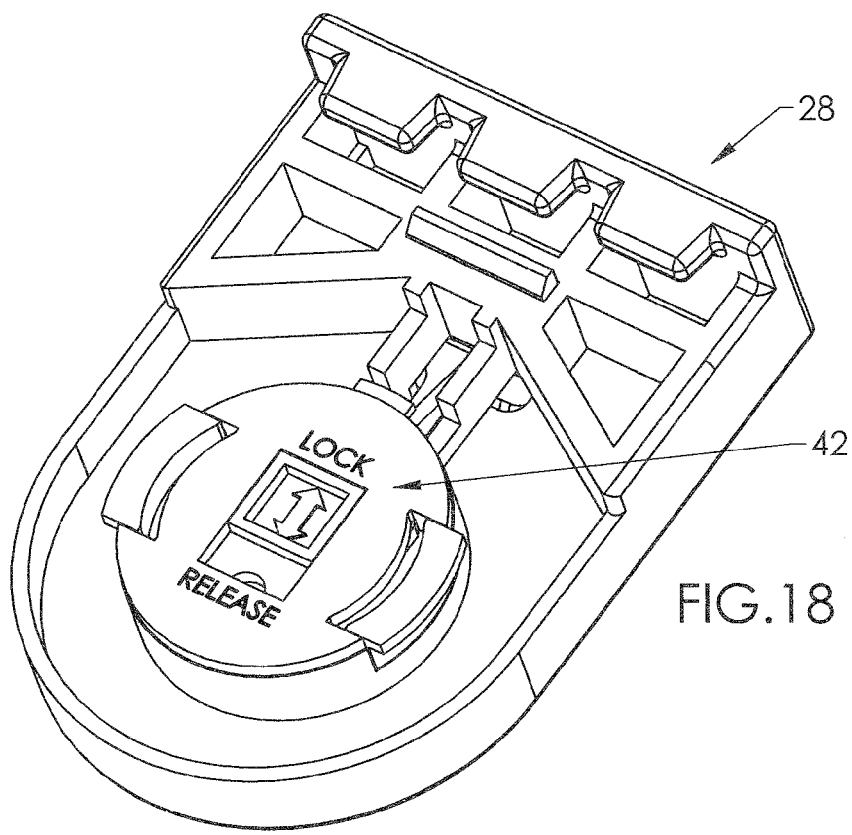
FIG. 18 is an isometric view of one side of the rotatable gusset head. This image shows the lock for preventing additional rotation engaged.
Figure 19:
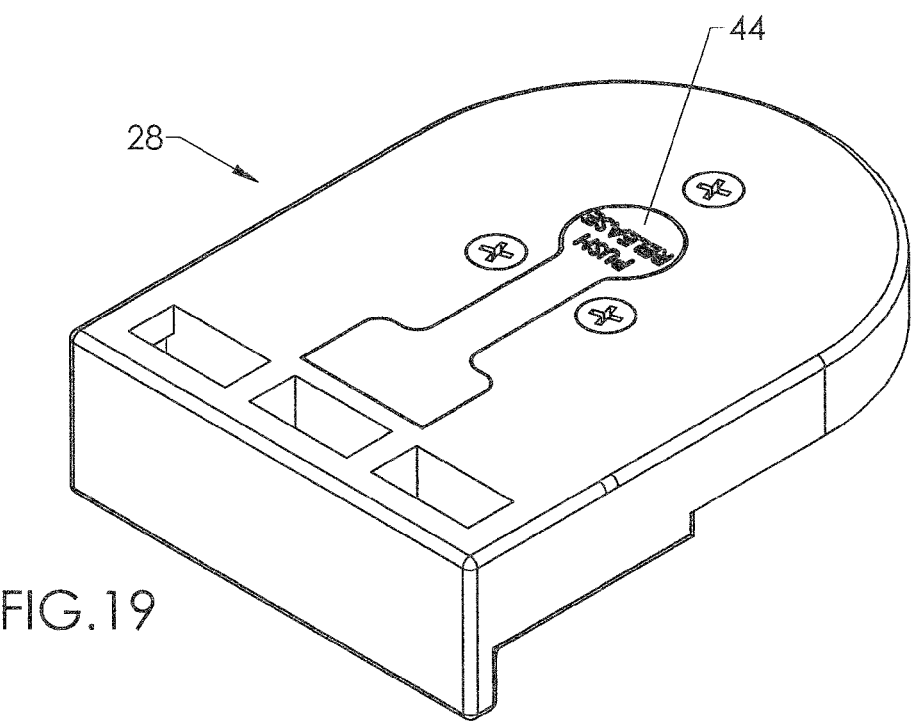
FIG. 19 is an isometric view of the other side of the rotatable gusset head. This image shows the lock for preventing additional lateral movement engaged.
Figure 20:
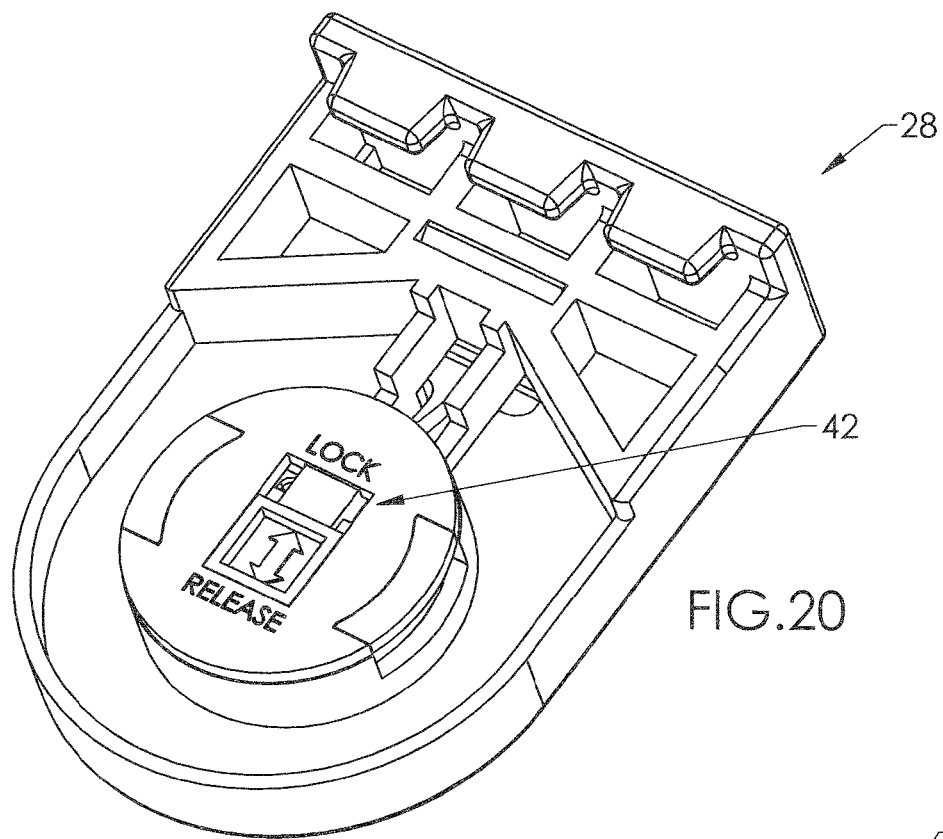
FIG. 20 is an isometric view of one side of the rotatable gusset head, similar to FIG. 18. In this view, the lock for preventing additional rotation is disengaged.

FIGS. 18-19 show isometric bottom and top views respectively, of the gusset swivel 28 in a dual locked position. FIG. 18 shows the bottom side of the gusset swivel 28, which has the gusset attachment lock 42. The gusset attachment lock 42 of the gusset swivel 28 engages to attach a gusset swivel 28 to the gusset toothhalf 30 or gusset latchhalf 32 by extending out two tabs. When the gusset attachment lock 42 is disengaged, such as seen in FIG. 20, the extended tabs are retracted and the gusset toothhalf 30 or gusset latchhalf 32 would no longer be locked into place. The gusset attachment lock's inner components, seen in the exploded view of FIG. 22, work in a manner similar to the corner/frame locks 34, with extruded pins of a sliding thumb lock 50 sliding within cut channels of left side 46 and right side frame tab 48 components. The pins and channels of the gusset attachment lock 42 can be seen in FIG. 22.

Figure 21:
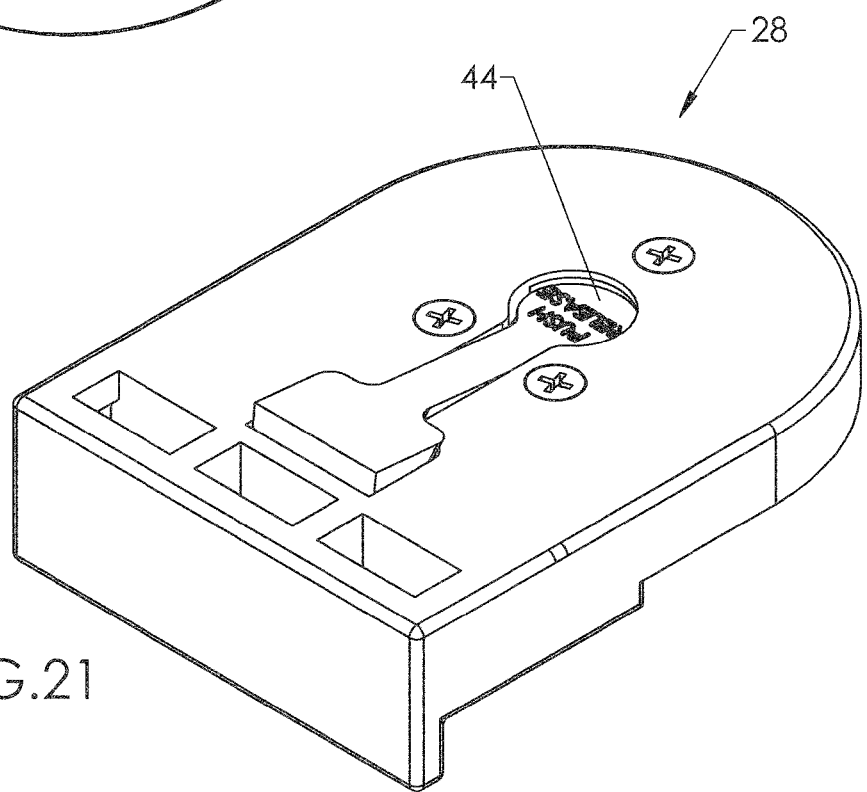
FIG. 21 is an isometric view of the other side of the rotatable gusset head, similar to FIG. 19. In this view, the lock for preventing additional lateral movement is shown disengaged.

As shown in FIG. 21, a "push release" lock 44 is located on the top face of the gusset swivel 28, and acts to extend a tab into the frame member that the gusset swivel 28 attaches to. The tab is extended and retracted due to the rotation of the "push release" lock 44 about a central integral axis. The extended tab from the "push release" lock 44 prevents the gusset swivel 28 from being removed from the packaging crate frame component, until the "push release" lock 44 is pushed and the extended tab is retracted from the packaging crate frame. A top view of the "push release" lock 44 when it is disengaged is shown in FIG. 21.

Figure 22:
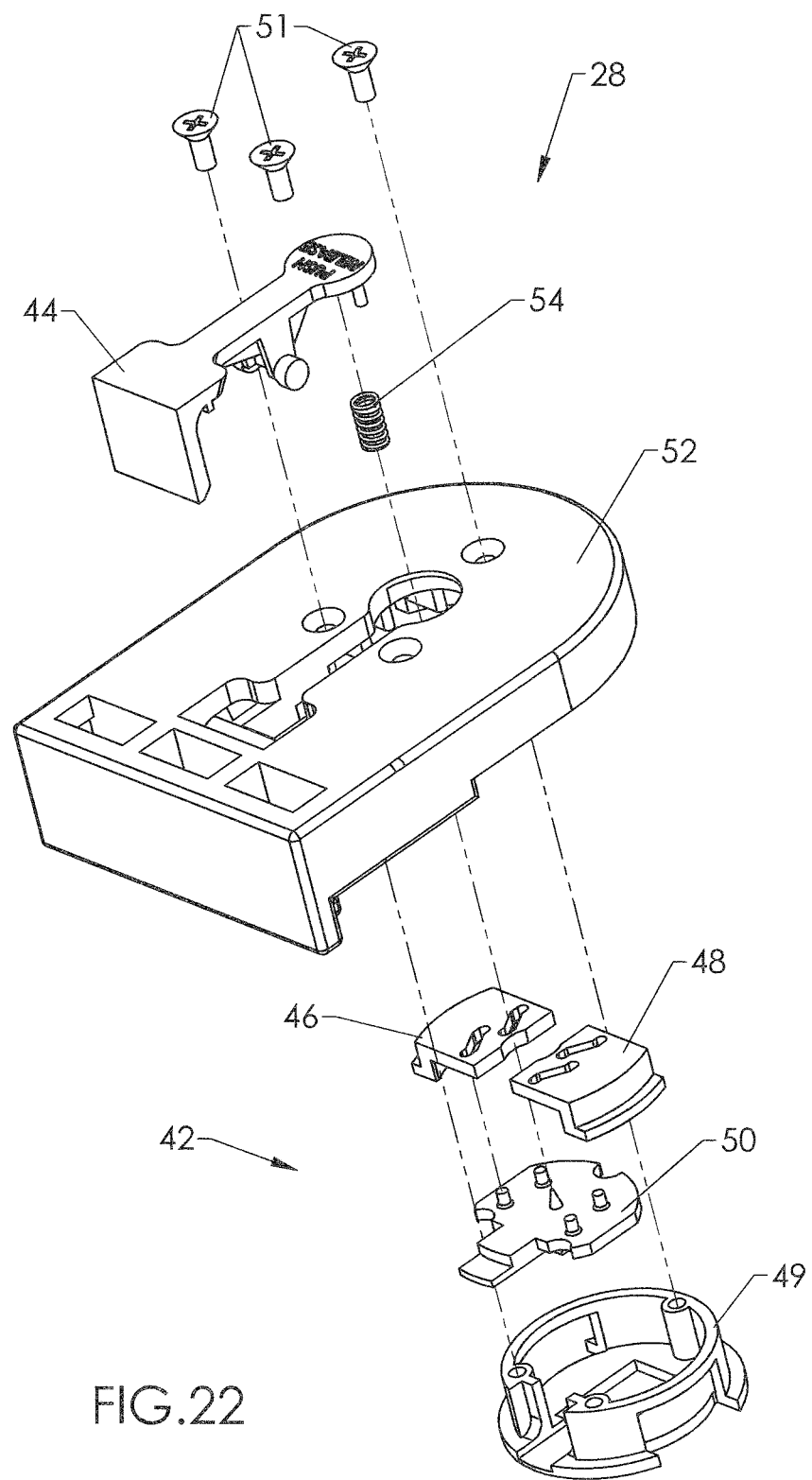
FIG. 22 is an exploded isometric view of the rotatable gusset head of FIGS. 18-21.

A complete exploded top isometric view of the gusset swivel 28 is shown in FIG. 22. This view illustrates the inner components of the two locks, body 49, fasteners 51, and the gusset swivel body 52. A spring 54 located between the gusset attachment lock 42 and the "push release" lock 44 acts to keep both of the locks engaged. The spring 54 pushes against the "push release" lock 44, and acts to toggle the gusset attachment lock 42 into either the "Lock" or "Release" positions.

Varying versions of the gusset subassembly 12 are shown in FIGS. 23-25. The first version shown in FIG. 23 is of a non-extended gusset subassembly 12 with a gusset swivel 28 attached to both ends of its length. A second version shown in FIG. 24 has a gusset subassembly 12 with a gusset extension 56 attached to the gusset toothhalf 30. The gusset extension 56 allows for a much longer extension than just the gusset subassembly 12 on its own. Attached to the end of the gusset extension 56 is the gusset swivel 28 that the gusset extension 56 took the place of on the gusset subassembly 12. The gusset subassembly version shown in FIG. 24 is similar to the version of FIG. 25. The difference between these two latter versions is that the gusset extension 56 is attached to the gusset latchhalf 32 of the gusset subassembly 12 in FIG. 25, rather than the gusset toothhalf 30 as in FIG. 24.

FIGS. 26, 26A, and 26B show an exploded view of the gusset latchhalf 32 component of a gusset subassembly 12. The gusset latchhalf 32 has gusset lock 58, to limit the motion of gusset toothhalf 30 within the channel track of the gusset latchhalf 32. The thumb slide lock 60 of gusset lock 58 is shown in the detailed view labeled FIG. 26A. This version of the thumb slide lock 60 varies from the corner/frame locks 34 in shape, but operates similarly, with extruded pins that slide within cut channels of a left side 64 and right side gusset lock half 62. A detailed view of the right gusset lock half 62 and a spring 63, used to keep separating pressure between the gusset lock halves, is shown in FIG. 26B. The gusset lock 58 operates with the spring 63 by applying constant pressure between the gusset lock halves keeping them engaged into the toothed pattern of the gusset toothhalf 30, and preventing unwanted extension of the gusset subassembly 12. When the gusset subassembly 12 needs to be extended or taken apart, the thumb slide lock 60 is slid from the "Lock" position to the "Release" position. In the "Release" position, the extruded pins of slide lock 60's bottom surface slide in the gusset lock halves' channels, and act to compress the spring 63 between the two halves by bringing them closer together. With the two gusset lock halves closer together, gusset toothhalf 30 is released from the gusset lock 58 of the gusset latchhalf 32.

An exploded view of an extended gusset subassembly 12, similar to the embodiment of FIG. 24, is shown as FIG. 27.

The exploded view breaks up the gusset subassembly 12 into the gusset swivel 28, gusset extension 56, and gusset attachment lock 42. Unique to this view, is the how gusset extension 56 attaches to gusset subassembly 12 by using three fastening bolts 66 that go through the gusset extension 56 and, in this embodiment, the gusset toothhalf 30, threading into holes of the gusset attachment lock 42 as shown in detail FIG. 27A. The top surface of the gusset lock 58 is shown in detail FIG. 27B. This top surface is the surface that the consumer pushes back and forth with a finger or thumb to engage or disengage the gusset lock 58.

Figures 28, 28A:
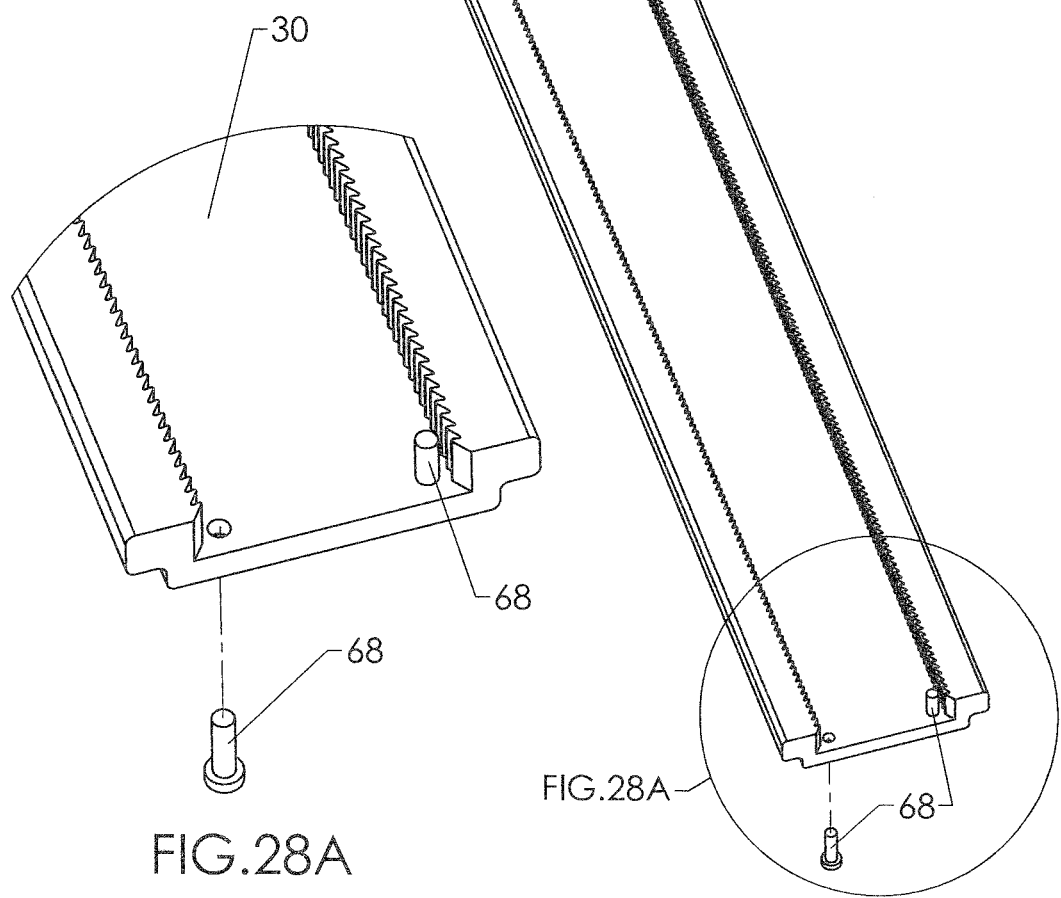
FIG. 28 is an isometric view of the gusset toothhalf of a gusset subassembly.
FIG. 28A is a detailed isometric view of the extension limiting end pins of the gusset toothhalf component shown in the circled region 28A of FIG. 28.

An isolated isometric view of the gusset toothhalf 30 with extension limiting endpins 68 is shown in FIG. 28. The extension limiting endpins 68, shown in detail in FIG. 28A, act as stopping points preventing accidental over-extension of the gusset subassembly 12 when it is in use. The extension limiting endpins 68 stop additional extension of the gusset subassembly 12 when the end tab of a gusset latchhalf 32 runs into the extension limiting endpins 68.

Figure 29:
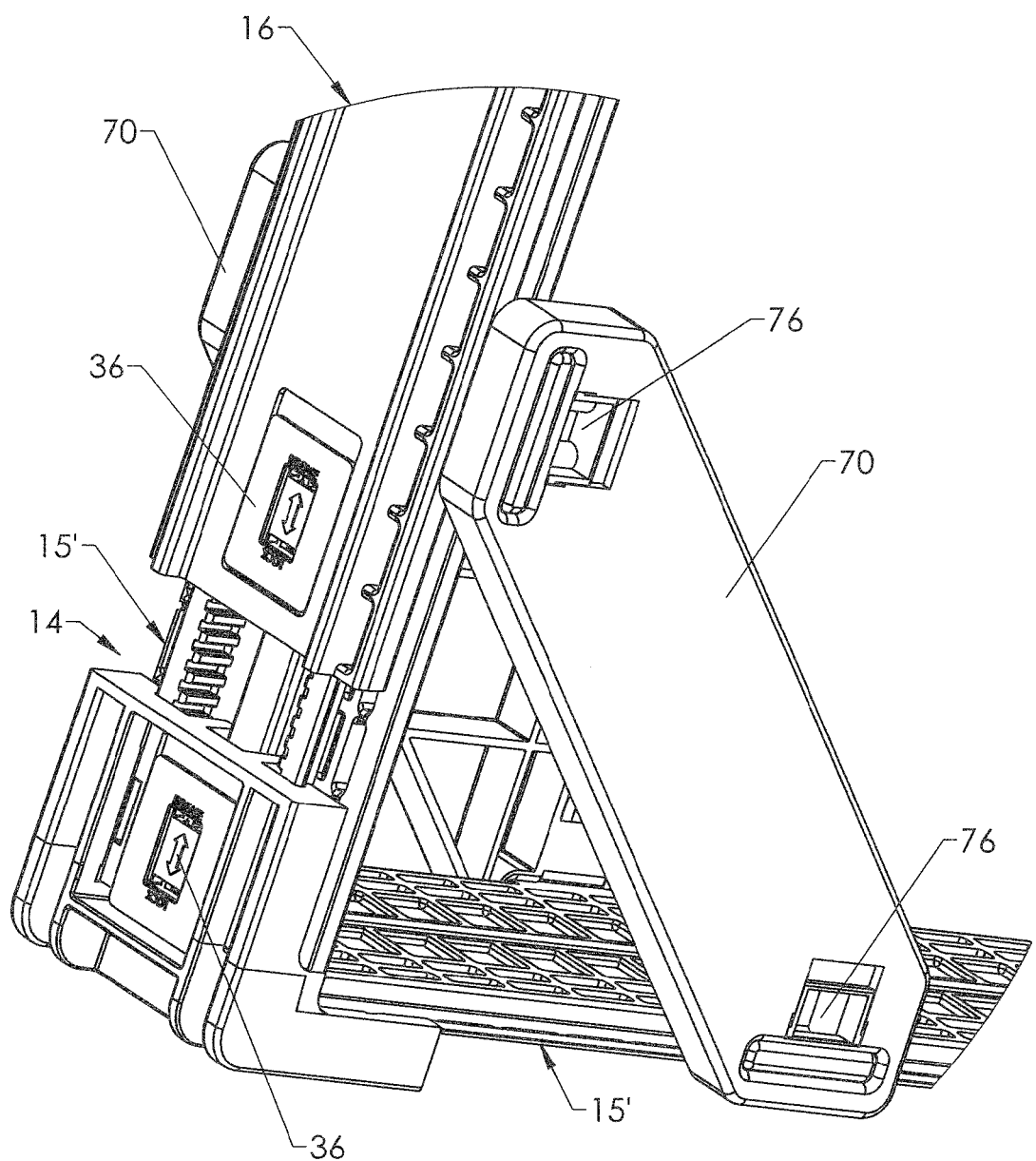
FIG. 29 is a top, perspective view of a corner subassembly 14, with two added cross-corner struts 70 known as bolsters firmly connected by strut locks 76 to lugs 72 on both the lateral sides of adjacent extension members 15', one of which is connected to locking frame member 16.
Figure 30:
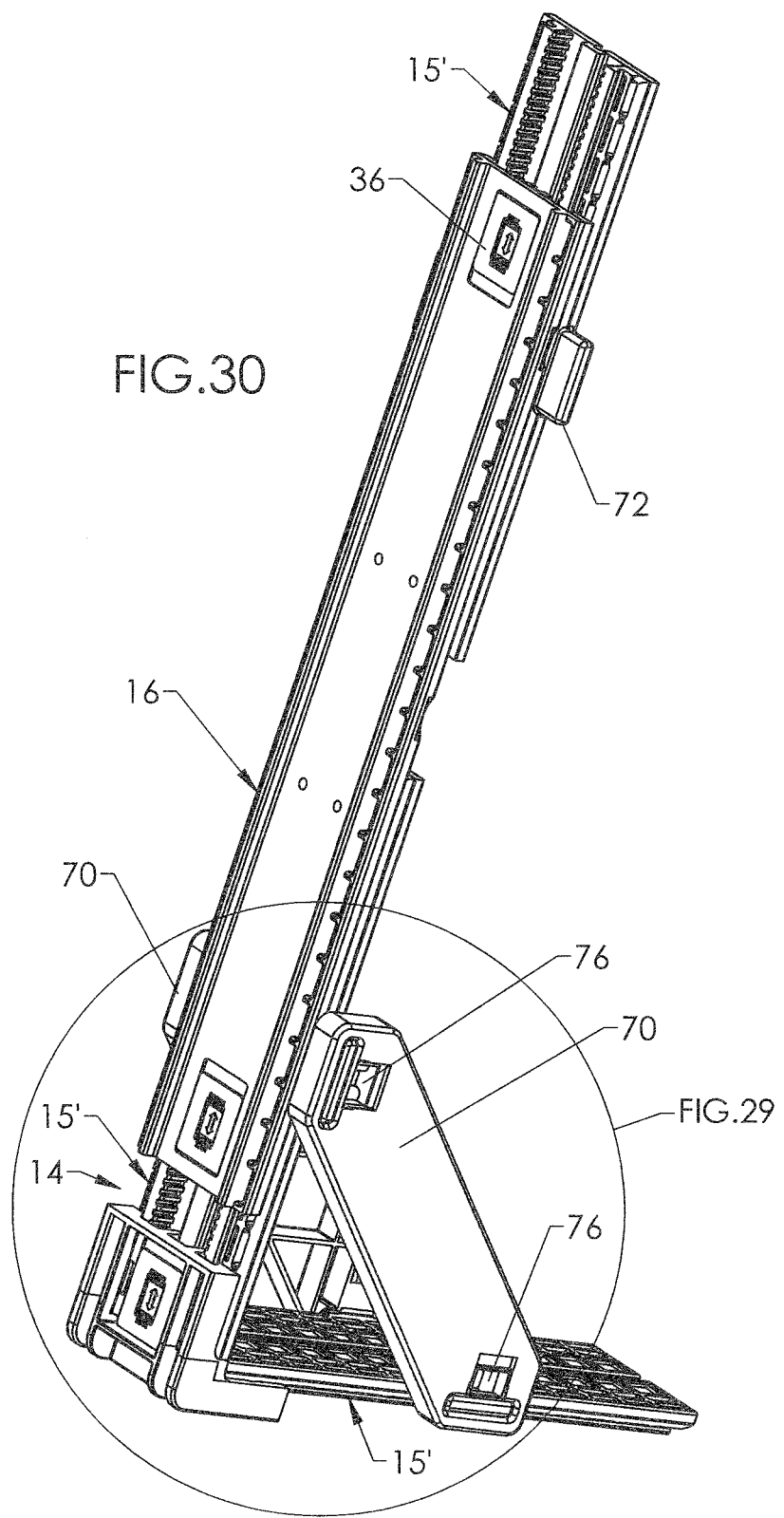
FIG. 30 is the view of FIG. 29, but from a farther perspective, and showing an additional extension frame member 15' connected to locking frame member 16.
Figure 31:
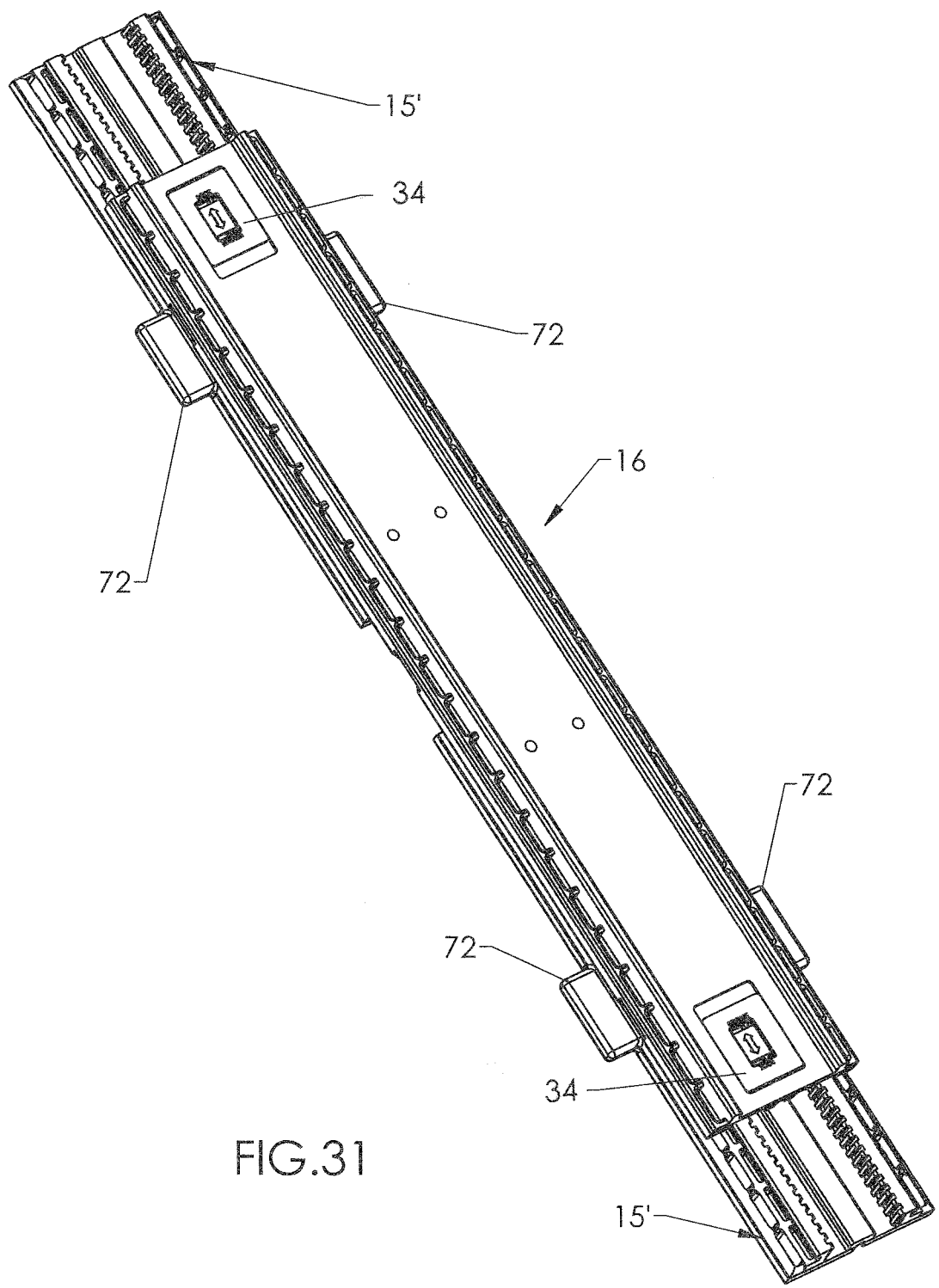
FIG. 31 is a top, perspective view of a locking frame member 16, connected to two extension frame members 15'.

Reference is now made to FIGS. 29-42, as follows:

FIG. 29 is a top, perspective view of a corner subassembly 14, with two added cross-corner struts 70 known as bolsters firmly connected by strut locks 76 to lugs 72 on both the lateral sides of adjacent extension members 15', one of which is connected to locking frame member 16. FIG. 30 is the view of FIG. 29, but from a farther perspective, and showing an additional extension frame member 15' connected to locking frame member 16. FIG. 31 is a top, perspective view of a locking frame member 16, connected to two extension frame members 15'. FIG. 32A is a top, perspective view of the outside of a cross-corner strut 70. FIG. 32B is a top, perspective view of the inside of a cross-corner strut 70. FIG. 33 is a top, perspective view of an active, second lock 74 for gusset lock 58.

Figure 34A:
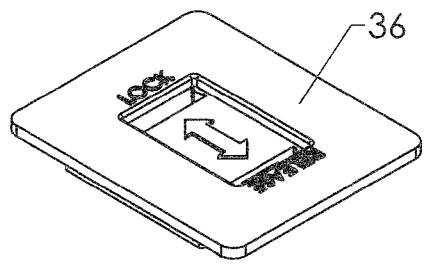
FIG. 34A is a top, perspective view of the outside top of frame lock 34.
Figure 34B:
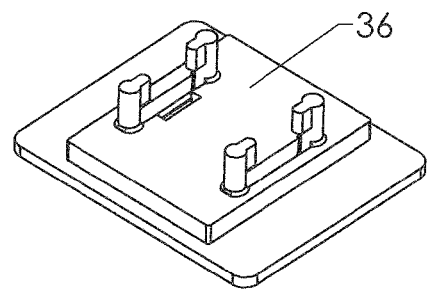
FIG. 34B is a top, perspective view of the inside bottom of frame lock 34.
Figure 35B:
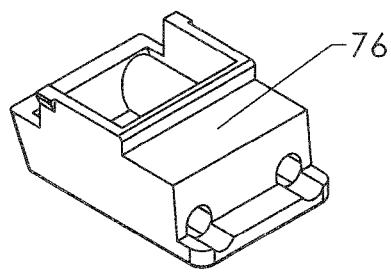
FIG. 35B is a bottom, perspective view of strut lock 76.
Figure 35A:
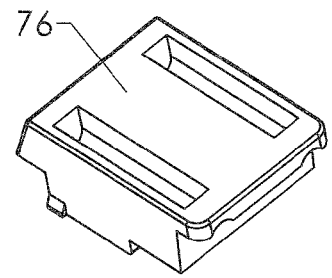
FIG. 35A is a top, perspective view of strut lock 76.
Figure 36A:
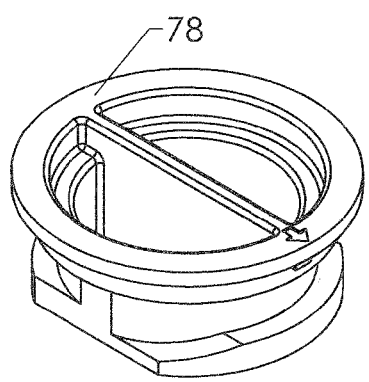
FIG. 36A is a top, perspective view of frame link lock 78.
Figure 36B:
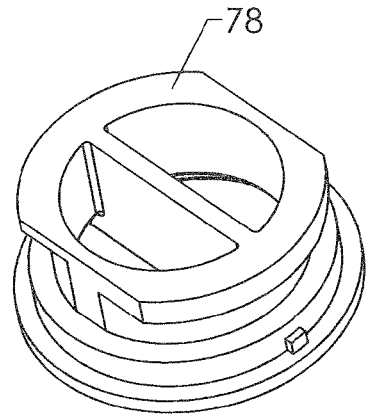
FIG. 36B is a bottom, perspective view of frame link lock 78.

FIG. 34A is a top, perspective view of the outside top of frame lock 34. FIG. 34B is a top, perspective view of the inside bottom of frame lock 34. FIG. 35A is a top, perspective view of strut lock 76. FIG. 35B is a bottom, perspective view of strut lock 76. FIG. 36A is a top, perspective view of frame link lock 78. FIG. 36B is a bottom, perspective view of frame link lock 78.

Figure 37A:
FIG. 37A is a top, perspective view of a 1.5 inch frame link 80.
Figure 37B:
FIG. 37B is a bottom, perspective view of a 1.5 inch frame link 80.
Figure 38:
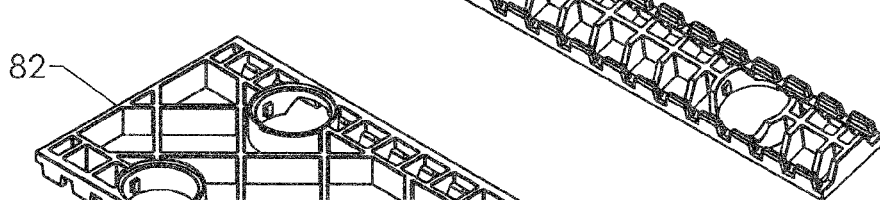
FIG. 38 is a top, perspective view of a 6 inch frame link 82.
Figure 39:
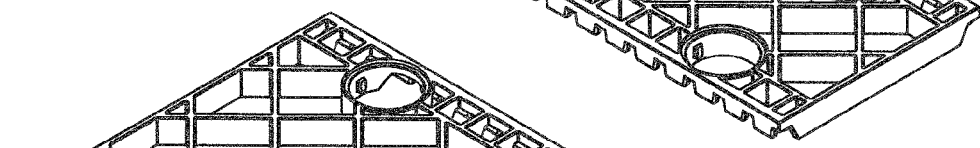
FIG. 39 is a top, perspective view of a 10 inch frame link 84.
Figure 40:
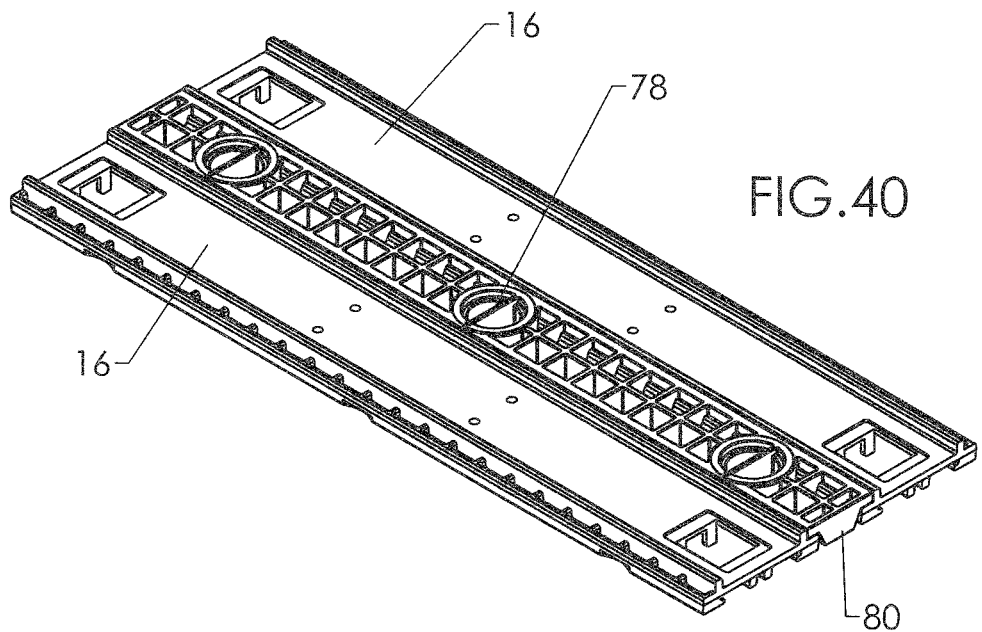
FIG. 40 is a top, perspective view of a 1.5 inch frame link 80 connecting two locking frame members 16 together side-by-side.
Figure 41:
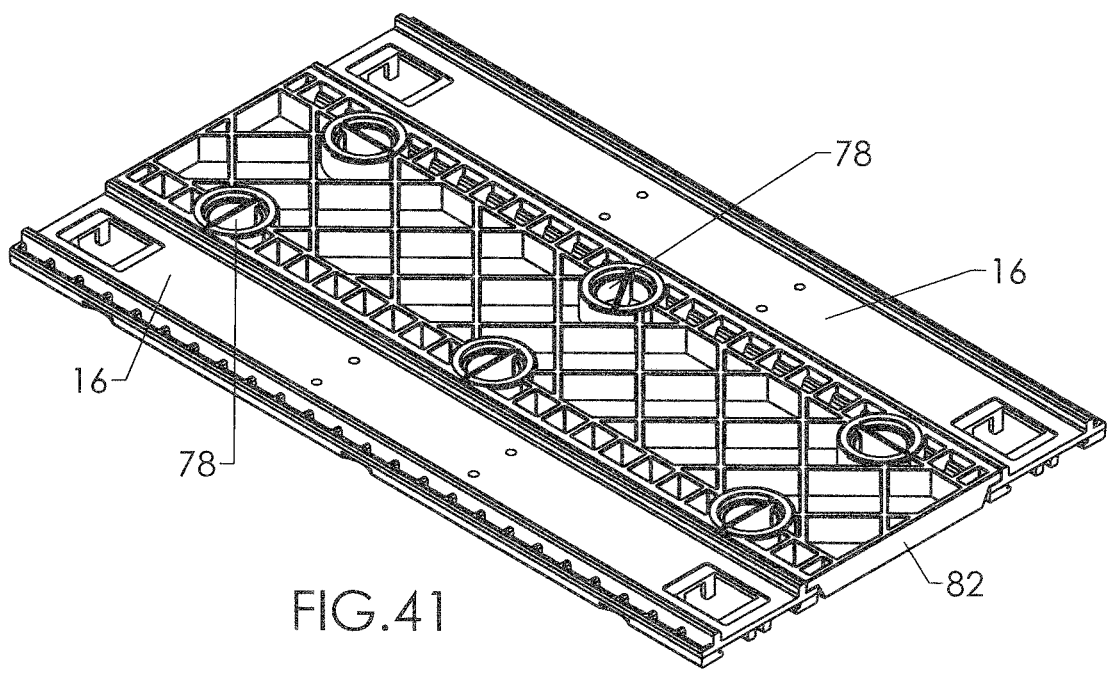
FIG. 41 is a top, perspective view of a 6 inch frame link 82 connecting two locking frame members 16 together side-by-side.
Figure 42:
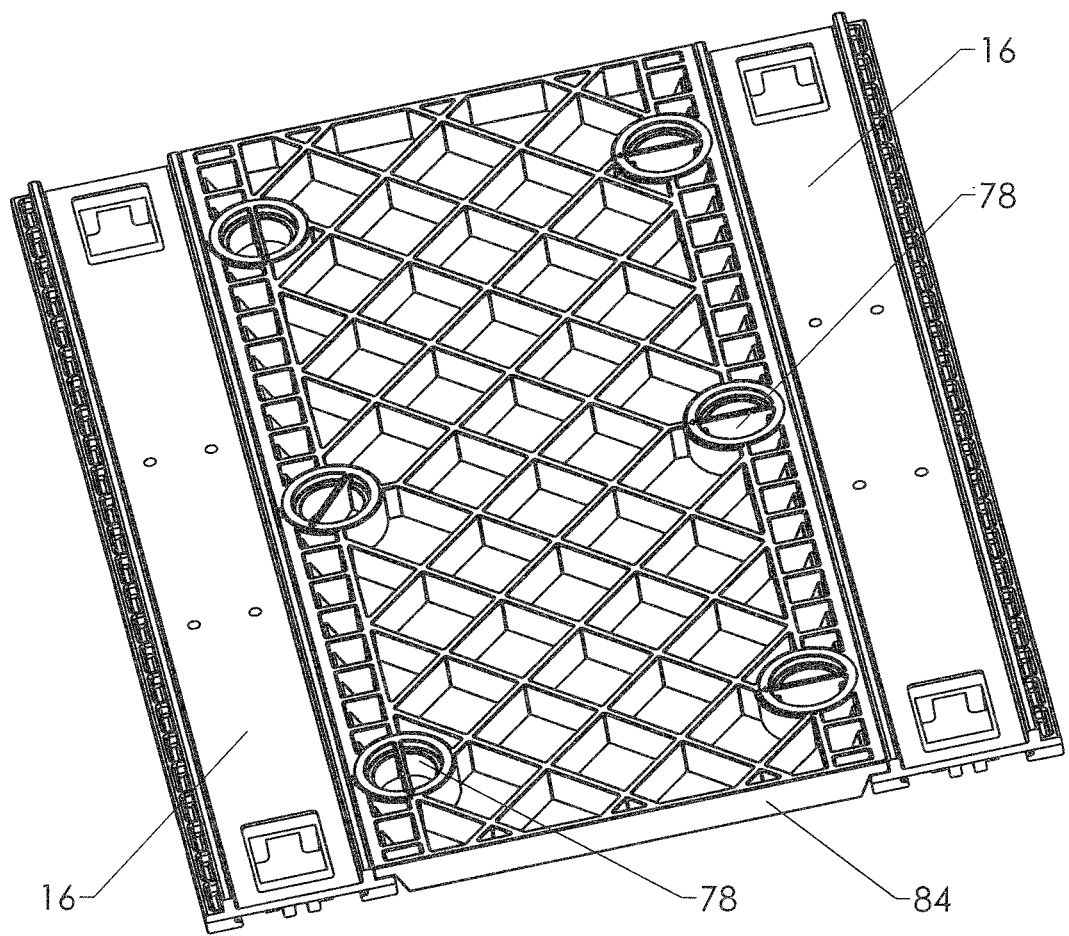
FIG. 42 is a top, perspective view of a 10 inch frame link 84 connecting two locking frame members 16 together side-by-side.

FIG. 37A is a top, perspective view of a 1.5 inch frame link 80. FIG. 37B is a bottom, perspective view of a 1.5 inch frame link 80. FIG. 38 is a top, perspective view of a 6 inch frame link 82. FIG. 39 is a top, perspective view of a 10 inch frame link 84. FIG. 40 is a top, perspective view of a 1.5 inch frame link 80 connecting two locking frame members 16 together side-by-side. FIG. 41 is a top, perspective view of a 6 inch frame link 82 connecting two locking frame members 16 together side-by-side. FIG. 42 is a top, perspective view of a 10 inch frame link 84 connecting two locking frame members 16 together side-by-side.

Although this disclosed technology has been described above with reference to particular means, materials, and embodiments, it is to be understood that the disclosed technology is not limited to these disclosed particulars, but extends instead to all equivalents within the scope of the following claims.

We claim:

1. An adjustable, resusable, modular packaging crate for containing and transporting a mostly-two-dimensional item, the crate comprising:
   a rectangular frame having a front, a back, and an interior space surrounded and defined by the frame for receiving the item, the frame comprising a plurality of corner subassemblies each including a corner and two extension frame members extending from each end of the corner, and a plurality of elongated locking frame members each slidably connecting and latching to two of the extension frame members, wherein, when unlatched, each locking frame member is slidable longitudinally relative to said two extension frame members for adjusting distance between the corner subassemblies to change the shape and size of the frame; and
   the crate further comprising:
   at least one rigidifying, elongated cross-frame gusset extending diagonally between two of the locking frame members in front of said interior space, and at least one rigidifying, elongated cross-frame gusset extending diagonally between two of the locking frame members in back of the said interior space;
   wherein each of the gussets is longitudinally slidably extendable and retractable in length and has ends rotatably attached to the locking frame members, so that, when the locking frame members are unlatched and slid to change said distance between corners subassemblies, each gusset extends or retracts in length and the ends of each gusset rotate relative to the locking frame members, to allow the change in size and/or shape of the frame; and
   wherein each gusset comprises a lock for preventing the gusset from extending or retracting in length, and locks for preventing the ends from rotating relative to the locking frame members, for rigidifying the frame after said adjusting the distance between the corner subassemblies.

2. The crate of claim 1, wherein the ends of each gusset are slidable along the lengths of the locking frame members, and the ends of each gusset each comprise a lock for preventing the ends of each gusset from sliding along said length of the locking frame members after said adjusting the distance between the corner subassemblies.

3. The crate of claim 1, wherein each of the locking frame members has an outer longitudinal edge forming part of an outer perimeter of the frame, and the ends of the gussets extend outward to the outer perimeter of the frame by connecting to said outer longitudinal edge.

4. The crate of claim 1, wherein said at least one gusset in front of said interior space is generally perpendicular to said at least one gusset in back of said interior space.

5. The crate of claim 1, further comprising a plurality of clamps for securing the item in the interior space, each of said clamps extending inward from the frame toward the interior space and comprising a solid jaw and a movable jaw for receiving a portion of the item between said solid jaw and said movable jaw.

6. The crate of claim 5, wherein each of said extension frame members has a length, and each of said clamps is slidable longitudinally on one of the extension frame members.

7. The crate of claim 1, wherein the locking frame members are top, bottom, first side, and second side locking frame members, and one gusset of said at least one gusset extending in front of said interior space extends diagonally between the top and first side locking frame members, and one gusset of said at least one gusset extending in back of said interior space extends diagonally between the top and second side locking frame members.

8. The crate of claim 7, wherein another gusset of said at least one gusset extending in front of said interior space extends diagonally between the bottom and second side locking frame members, and another gusset of said at least one gusset extending in back of said interior space extends diagonally between the bottom and first side locking frame members.

9. The crate of claim 1, further comprising a cross-corner strut connected to said two extension frame members of one of said corner subassemblies.

10. An adjustable, resusable, modular packaging crate for containing and transporting a mostly-two-dimensional item, the crate comprising:

a rectangular frame having a front, a back, and an interior space surrounded and defined by the frame for receiving the item, the frame comprising a plurality of corner subassemblies, and a plurality of elongated locking frame members each having a length and adjustably connected and latched to the corner subassemblies, so that, when unlatched, each locking frame member is slidable longitudinally relative to the two corner subassemblies for adjusting distance between the corner subassemblies to change the shape and size of the frame; and the crate further comprising:

an elongated cross-frame gusset extending between two of the locking frame members in front of said interior space, and an elongated cross-frame gusset extending between two of the locking frame members in back of the said interior space;

wherein each of the gussets is longitudinally slidably extendable and retractable in length and has ends rotatably and slidably-attached to the locking frame members, so that, when the locking frame members are unlatched and slid to change said distance between corners subassemblies, each gusset extends or retracts in length, and the ends of each gusset rotate relative to, and slide along the lengths of, the locking frame members, to allow the change in size and/or shape of the frame; and wherein each gusset comprises locks for preventing the gusset from extending or retracting in length, and the ends from rotating and from sliding relative to the locking frame members, for rigidifying the frame after said adjusting the distance between the corner subassemblies.

11. The crate of claim 10, wherein each of the locking frame members has an outer longitudinal edge forming part of an outer perimeter of the frame, and the ends of the gussets extend outward to connect to a portion of the outer perimeter of the frame.

12. The crate of claim 10, wherein said at least one gusset in front of said interior space is generally perpendicular to said at least one gusset in back of said interior space.

13. The crate of claim 10, further comprising a plurality of clamps for securing the item in the interior space, each of said clamps extending inward from the frame toward the interior space and comprising a solid jaw and a movable jaw for receiving a portion of the item between said solid jaw and said movable jaw.

14. The crate of claim 13, wherein each of said extension frame members has a length, and each of said clamps is slidable longitudinally on one of the extension frame members.

15. The crate of claim 10, further comprising a cross-corner strut connected to one of said corner subassemblies.

16. A combination of an adjustable packaging crate and item contained therein for shipping the item, wherein:

the crate comprises:

a rectangular frame having a front, a back, and an interior space surrounded and defined by the frame, the frame comprising a plurality of corner subassemblies each including a corner and two extension frame members extending from each end of the corner, and a plurality of elongated locking frame members each slidably connecting and latching to two of the extension frame members, wherein, when unlatched, each locking frame member is slidable longitudinally relative to said two extension frame members for adjusting distance between the corner subassemblies to change the shape and size of the frame to fit the item; and at least one rigidifying, elongated cross-frame gusset extending diagonally between two of the locking frame members in front of said interior space, and at least one rigidifying, elongated cross-frame gusset extending diagonally between two of the locking frame members in back of the said interior space;

wherein each of the gussets is longitudinally slidably extendable and retractable in length and has ends rotatably attached to the locking frame members, so that, when the locking frame members are unlatched and slid to change said distance between corners subassemblies, each gusset extends or retracts in length and the ends of each gusset rotate relative to the locking frame members, to allow the change in size and/or shape of the frame; and wherein each gusset comprises a lock for preventing the gusset from extending or retracting in length, and locks for preventing the ends from rotating relative to the locking frame members, for rigidifying the frame after said adjusting the distance between the corner subassemblies; and wherein the item contained in the crate is received in the interior space of the frame between said at least one gusset extending diagonally in front of said interior space and said at least one gusset extending diagonally in back of the said interior space.

* * * * *